United States Patent
Tanner

(10) Patent No.: US 10,341,664 B2
(45) Date of Patent: Jul. 2, 2019

(54) CONFIGURABLE INTRA CODING PERFORMANCE ENHANCEMENTS

(71) Applicant: INTEL CORPORATION, Santa Clara, CA (US)

(72) Inventor: Jason Tanner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 14/857,633

(22) Filed: Sep. 17, 2015

(65) Prior Publication Data

US 2017/0085885 A1    Mar. 23, 2017

(51) Int. Cl.

| | |
|---|---|
| H04N 19/103 | (2014.01) |
| H04N 19/105 | (2014.01) |
| H04N 19/107 | (2014.01) |
| H04N 19/109 | (2014.01) |
| H04N 19/11 | (2014.01) |
| H04N 19/156 | (2014.01) |
| H04N 19/159 | (2014.01) |
| H04N 19/176 | (2014.01) |
| H04N 19/137 | (2014.01) |

(52) U.S. Cl.
CPC ......... *H04N 19/156* (2014.11); *H04N 19/105* (2014.11); *H04N 19/159* (2014.11); *H04N 19/176* (2014.11); *H04N 19/137* (2014.11)

(58) Field of Classification Search
CPC .. H04N 19/103; H04N 19/105; H04N 19/107; H04N 19/10911
USPC .................................................... 375/240.13
See application file for complete search history.

(56) References Cited

U.S. PATENT DOCUMENTS

| | | | |
|---|---|---|---|
| 2005/0276326 A1* | 12/2005 | Drezner | H04N 19/176 375/240.12 |
| 2008/0273810 A1 | 11/2008 | Subramania et al. | |
| 2009/0274211 A1 | 11/2009 | Zhou et al. | |
| 2011/0075735 A1 | 3/2011 | Drezner | |
| 2013/0016783 A1 | 1/2013 | Kim et al. | |
| 2013/0121401 A1 | 5/2013 | Zheludkov et al. | |

OTHER PUBLICATIONS

International Search Report and Written Opinion for International Patent Application No. PCT/US2016/045619, dated Nov. 4, 2016.
International Preliminary Report on Patentability for International Patent Application No. PCT/US16/45619, dated Mar. 29, 2018.

* cited by examiner

*Primary Examiner* — Dominic D Saltarelli
(74) *Attorney, Agent, or Firm* — Green, Howard & Mughal LLP

(57) ABSTRACT

Techniques related to intra coding performance enhancements discussed. Such techniques may include determining intra coding modes based in part on processing performance costs associated with available intra modes and/or generating a block encode order based on intra coding modes, performing encoding, and re-ordering the encoded blocks to a default coding order for bitstream insertion.

21 Claims, 11 Drawing Sheets

FIG. 4

CONFIGURABLE INTRA CODING PERFORMANCE ENHANCEMENTS

BACKGROUND

A video encoder compresses video information so that more information can be sent over a given bandwidth or saved in a given file size. The compressed signal or file may be transmitted to a receiver or video decoder that may decode or decompress the signal or file for display to a user. Such video encoder-decoder systems may follow a format or standard. For example, video compression standards include the H.264/MPEG-4 Advanced Video Coding (AVC) standard, the High Efficiency Video Coding (HEVC) standard, the VP8 standard, and the VP9 standard. Such standards may include basic functional modules such as intra/inter prediction, transform, quantization, in-loop filtering, and entropy coding.

In such advanced video coding standards, 16×16 macroblocks (in H.264) or up to 64×64 coding units (in HEVC) may be divided into smaller partition units and encoded. For example, a frame may be divided into blocks of different sizes that may be predicted either temporally (inter) or spatially (intra). After determining whether a block is to be intra or inter coded, the difference with block and associated source pixels may be determined. That difference (e.g., residual) may then be converted to the frequency domain (e.g., via discrete cosine transform) and converted to coefficients (e.g., via quantization). Such pixels may then need to be inverse quantized and inverse transformed such that after the inverse transform, a reconstructed image may be generated. For example, the reconstructed image is what the image will look like after a decoder decodes the bitstream.

In intra-prediction, spatially adjacent pixels with respect to a block are used for prediction. The determination of which spatially adjacent pixels are used for prediction is made based on available intra modes such that the mode that provides a lowest cost (e.g., in terms of distortion and bit rate) is selected for prediction. Such a mode decision may be based on reconstructed pixels or source pixels in various architectures. However, in some examples, a mode selection from the available modes may provide encode processing performance inefficiencies. Furthermore, some mode selections may offer very little compression improvement over other mode selections such that the encode processing performance inefficiencies do not offer requisite gains in video quality or bit rate savings.

Therefore, current encoding techniques may provide efficient compression, but, as discussed, they may provide performance inefficiencies in certain intra mode selections. As such, existing techniques do not provide improved computational efficiency while maintaining compression efficiency. Such problems may become critical as the desire to compress high quality video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 4 illustrates example intra coding modes;

DETAILED DESCRIPTION

Figure 1:
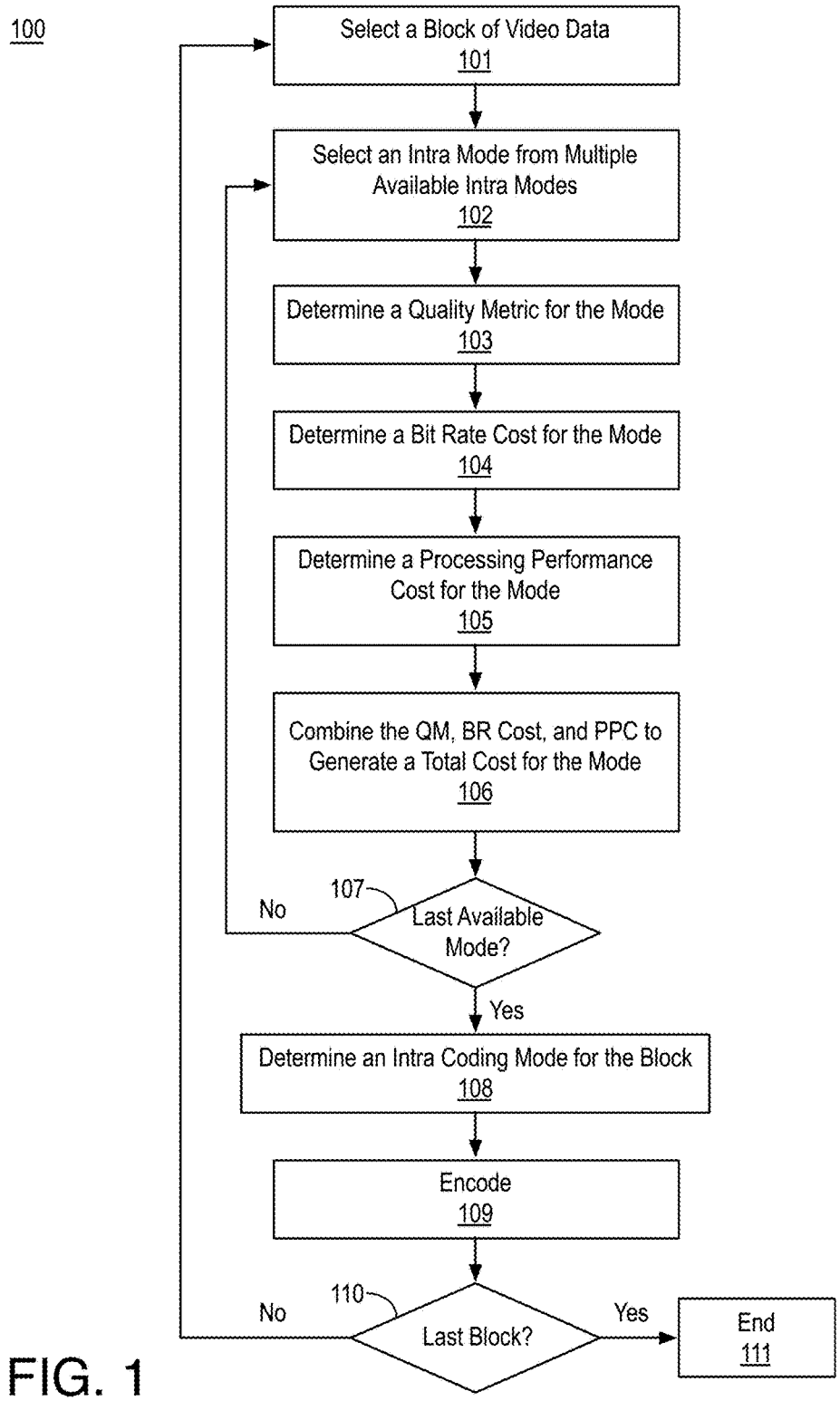
FIG. 1 is a flow diagram illustrating an example process for video encoding including selecting an intra mode based on processing performance costs.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to configurable intra coding with performance enhancements.

As described above, in the implementation of various video coding standards, video encoders may, in intra coding contexts, evaluate coding costs of available intra modes for a block of video data. Such techniques may provide coding efficiencies but may cause processing inefficiencies in some instances. For example, to intra code a current block of video data, reconstructed pixel data for one or more neighbor (or spatially adjacent) blocks is needed. Such reconstructed pixel data may be generated via a pipeline including transform, quantization, inverse quantization, and inverse transform stages. In some examples, a current block may need to wait for a reference block to be reconstructed before the current block may be differenced with the predicted block using the reconstructed neighbor pixels (e.g., to begin encoding the current block using the selected intra mode). Such waiting may cause processing inefficiencies or bubbles in the encode pipeline that waste clock cycles waiting for the needed data.

Furthermore, in some instances, the choices between intra modes may be between modes with very similar distortion and bit rates (e.g., similar compression). For example, if the current block is in a uniform surface and neighboring pixels are similarly uniform, several intra modes may provide good compression results. For example, the DC mode (e.g. intra prediction based on a mean of neighboring pixels above and to the left of the current block) may be commonly selected as a probable mode. However, in many instances, the DC mode may provide a performance bubble as the encode of the current block must await the block or blocks above and the block or blocks to the left of the current block, one or more of which may cause the current block to delay encode processing (e.g., particularly if any of those blocks are immediately before the current block in an encode order).

In some embodiments discussed herein, processing performance costs may be determined for multiple intra modes (e.g., available intra modes) such that the processing performance costs are based on one or more reference blocks associated with the plurality of intra modes and a processing order of the one or more reference blocks with respect to the current block. For example, for each intra mode, a processing performance cost may be determined or provided if the particular intra mode uses a reference block that is prior to the current block and may cause a processing bubble or delay. For example, a processing performance cost may be provided if the mode references a block that is immediately prior to the current block in the processing order. For example, such a processing order may cause a processing delay as the current block will need to wait for the reference block to be reconstructed before encode processing of the current block may begin.

Such processing performance costs may be determined using any suitable technique or techniques as is discussed further herein. Furthermore, such processing performance costs may be combined with (e.g., added to or the like) quality metrics (e.g., costs associated with distortion) and/or bit rate costs (e.g., costs associated with the number of bits needed to code the current block into a bitstream) to generate total costs for the available intra modes. An intra coding mode for the current block may be selected based at least in part on the processing performance costs for the plurality of intra modes. In an embodiment, the intra coding mode for the current block may be selected as the intra mode having the lowest total cost. Furthermore, the current block may be encoded into a bitstream based at least in part on the selected intra coding mode. For example, the current block may be differenced with predicted pixels based on the intra coding mode to generate a residual and the residual may be transformed into the frequency domain, quantized, and entropy coded into the bitstream.

In other embodiments discussed herein, an individual intra mode may be determined for each block of a plurality of blocks of video data. In an embodiment, the determined intra modes may be determined based on source pixel data (e.g., as opposed to reconstructed pixel data). Furthermore, based on a default block coding order, the determined intra modes may include or cause a processing delay as described herein. In some embodiments, a block encode order may be determined for the plurality of blocks based on the intra modes such that the block encode order is different than a default block coding order (e.g. the order the blocks will be encoded in the bitstream). For example, the block encode order may provide an order such that each reference block in the plurality of blocks is ordered prior to and with at least one intervening block with respect to every dependent block associated with the reference block. In some embodiments, a maximum number of intervening blocks may be provided. Such an ordering may eliminate or reduce processing delays. For example, the blocks may be encoded (e.g., differenced to generate residuals, transformed, and quantized) based on the encode order to generate encoded blocks. The encoded blocks may be re-ordered based on the default coding order and provided a bitstream. For example, the resultant bitstream may provide the blocks in the order expected by a decoder while the discussed block encode order may eliminate or reduce processing delays during encode.

FIG. 1 is a flow diagram illustrating an example process 100 for video encoding including selecting an intra mode based on processing performance costs, arranged in accordance with at least some implementations of the present disclosure. Process 100 may include one or more operations 101-111 as illustrated in FIG. 1. Process 100 may be performed by a device (e.g., encoder 700 as discussed herein) to determine an intra mode for a block of a video frame and to encode the block based on the final mode decision. Process 100 may be performed at a coding block or coding unit level and process 100 may be repeated for any number of coding blocks or coding units.

Process 100 may begin at operation 101, "Select a Block of Video Data", where a block of video data may be selected for processing. The block of video data may include any block of video data (e.g., a 16×16 block of spatially adjacent pixels or larger (32×32) or smaller (4×4) of a video frame) that may be intra coded as is discussed further herein with respect to FIGS. 2 and 3. For example, in the context of the H.264/MPEG-4 Advanced Video Coding (AVC) standard, the AVC standard defines a macroblock partition to refer to a block of pixels in a macroblock that share a common prediction mode. In some embodiments, the block may be a macroblock. In other embodiments, the block may be a prediction block or a partition. In the context of the High Efficiency Video Coding (HEVC), the HEVC standard defines a coding tree unit (CTU) for a picture (e.g., a video frame of a video sequence) that may be partitioned into coding units (CUs) that take the form of rectangular blocks having variable sizes. Such coding units may be used as the basic unit or block for intra coding. However, as discussed, the block of video data may include any block of video data that may be intra coded.

Figure 2:
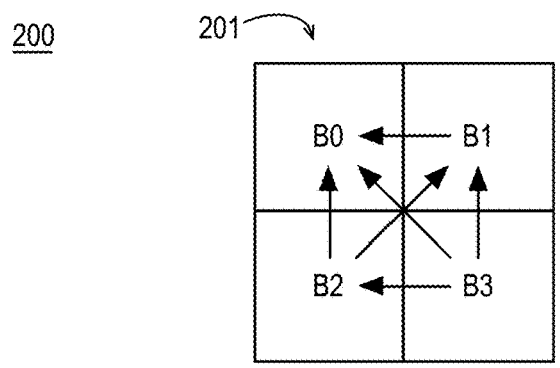
FIG. 2 illustrates example blocks of video data.

FIG. 2 illustrates example blocks 201 of video data 200, arranged in accordance with at least some implementations of the present disclosure. Blocks 201 of video data 200 may have any suitable size and shape such as a square shape (as shown) or rectangular shapes. Furthermore, blocks 201 may include any size such as 4×4 pixels, 8×8 pixels, 16×16 pixels, or the like. In the illustrated example, blocks 201 are labeled as B0, B1, B2, and B3. As discussed, in intra coding, a block may be predicted based on a reference block (e.g., a reconstructed reference block). For example, a block may be differenced with a reconstructed block to generate a difference or residual.

For example, in the context of FIG. 2, in some embodiments, block B1 may depend on block B0 for coding such that block B0 may be a reference block for coding block B1. Block B2 may depend on block B0 or block B1, or both for coding (e.g., blocks B0 and/or B1 may be a reference block for coding block B1). Block B3 may depend on block B0, block B1, block B2, or combination thereof for coding (e.g., blocks B0, B1, and/or B2 may be a reference block for coding block B2). FIG. 2 provides a simplified illustration of blocks 201 for the sake of clarity of presentation. As is discussed further herein and as will be apparent to one of skill in the art, other block dependencies may be available depending on the coding standard, block configurations, and/or available intra modes.

Figure 3:
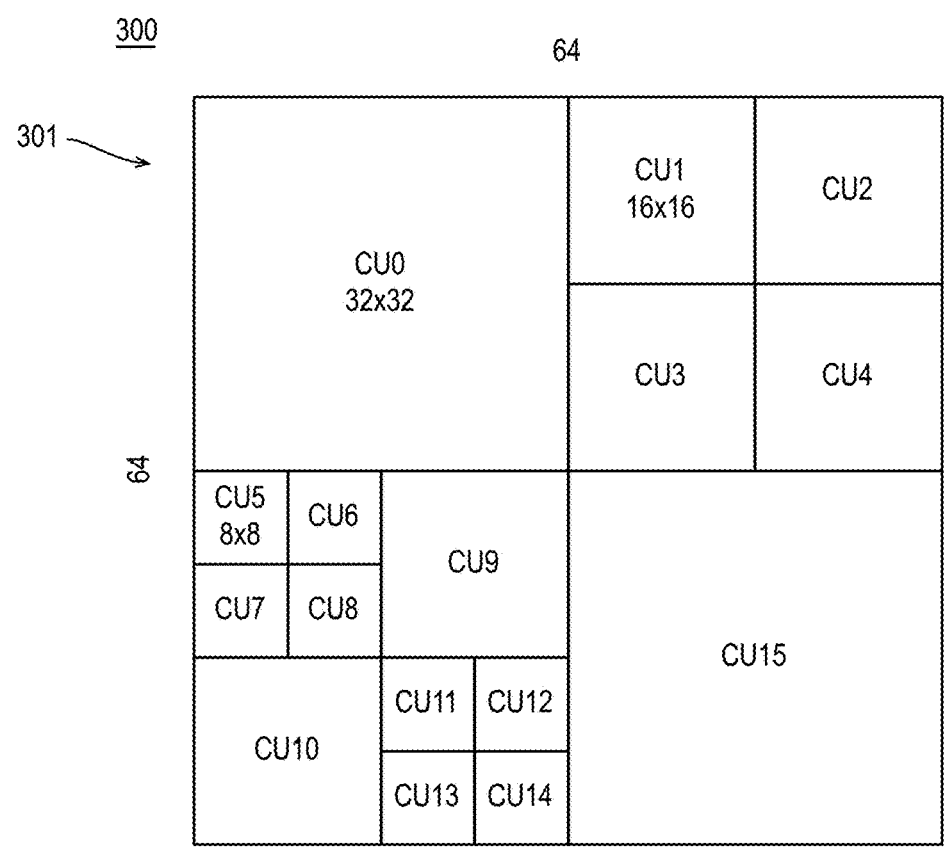
FIG. 3 illustrates an example coding tree unit and example coding units.

FIG. 3 illustrates an example coding tree unit 300 and example coding units 301, arranged in accordance with at least some implementations of the present disclosure. As shown in FIG. 3, in the context of HEVC, a coding tree unit 300 may be 64×64 pixels, which may define a largest coding unit (LCU). Also as shown, coding tree unit 300 may be partitioned for coding into coding units 301, which are labeled as CU0-CU15 in FIG. 3. As discussed herein with respect to FIG. 1, a block of video data may include a coding unit such as any of coding units 301. Furthermore, coding unit 0 (CU0) is labeled with its size, 32×32 pixels, coding unit 1 (CU1) is labeled with its size, 16×16 pixels, and coding unit 5 (CU5) is labeled with its size, 8×8 pixels. In the example of FIG. 3 coding units having the same size are shown with the same size of blocks such that CU15 is 32×32 pixels, CU2, CU3, CU4, CU9, and CU10 are 16×16 pixels, and CU6, CU7, CU8, CU11, CU12, CU13, and CU14 are 8×8 pixels.

As discussed, a block of video data may depend on a previously coded block or blocks (e.g., a reference block or blocks) of video data for intra coding. The reference block or blocks used for a particular block depends on the intra coding mode.

Figure 4:
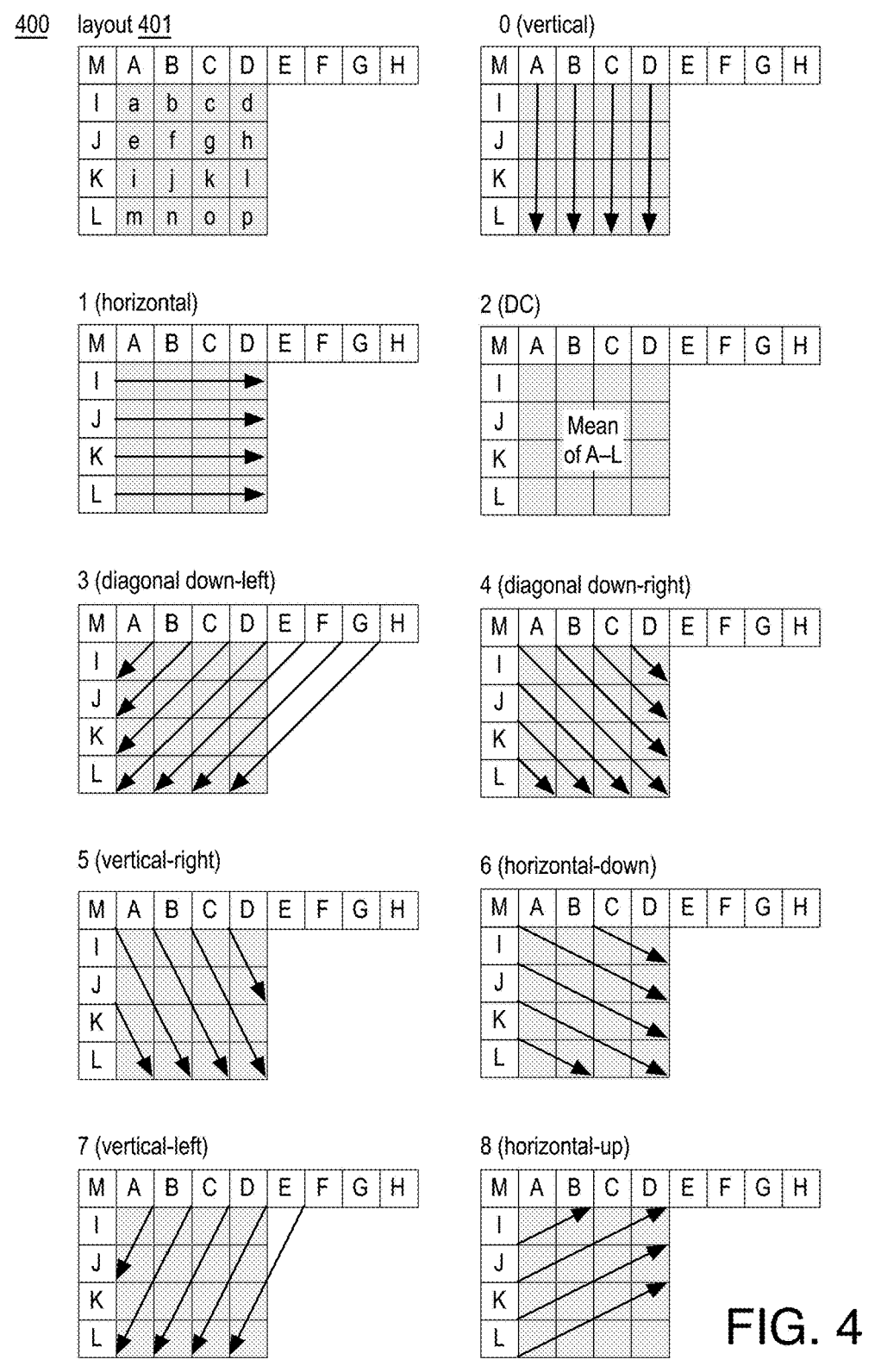

FIG. 4 illustrates example intra coding modes 400, arranged in accordance with at least some implementations of the present disclosure. For example, FIG. 4 may provide nine available luma intra coding modes in AVC. For example, with reference to layout 401, pixels a-p may be predicted using a portion of neighboring pixels A-M with the portion used for prediction being based on the mode. For example, mode 0 (vertical) may predict pixels a, e, i, m based on pixel A, pixels b, f, j, n based on pixel B, pixels c, g, k, o based on pixel C, and pixels d, h, l, p based on pixel D. In such an example, with reference to FIG. 2, block B2 would use block B0 as a reference for mode 0. Furthermore, in mode 2 (DC) pixels a-p may be predicted using a mean of pixels A-L. Again with reference to FIG. 2, block B3 would use blocks B1 and B2 as reference blocks for mode 2.

Intra coding modes 400 provide example modes and example block dependencies (e.g., between a block being coded and the required reference blocks). The techniques discussed herein may use any available coding modes using any block dependencies. For example, in the context of AVC, the nine intra modes illustrated in FIG. 4 may be used. In the context of HEVC, 35 intra modes (mostly directional) may be used. Returning to FIG. 3 and with reference to coding unit CU9 and intra coding modes 400, CU9 may use coding unit CU0 as a reference for mode 0, coding units CU6 and CU8 for mode 1, coding units C1, CU6, and CU8 for mode 2 (DC), and so on.

Returning to FIG. 1, processing may continue at operation 102, "Select an Intra Mode from Multiple Available Intra Modes", where an intra mode may be selected for evaluation from multiple available intra modes. The available intra modes may include any suitable intra modes such as all modes available based on a coding standard, a subset of such modes, or the like. In an embodiment, the available intra modes include the nine intra modes illustrated with respect to FIG. 4. In some embodiments, the available intra modes include the 35 intra modes available in HEVC. As shown, process 100 may iterate through modes to determine total costs for each mode (e.g., at operation 106) and to determine an intra coding mode for the current block (e.g., at operation 108). The available modes may be evaluated in any suitable order.

Processing may continue at operation 103, "Determine a Quality Metric for the Mode", where a quality metric may be determined for the current block and intra mode. The quality metric may be any suitable quality metric such as a measure of distortion, a sum of absolute differences, a mean squared error, or the like.

Processing may continue at operation 104, "Determine a Bit Rate Cost for the Mode", where a bit rate cost may be determined for the current block and intra mode. The bit rate cost may be determined using any suitable technique or techniques such as a count of actual bits needed to code the current block into the bitstream based on the current mode, an approximation of the bit rate cost, or the like. In some embodiments, operations 103 and 104 may be determined together using bit rate optimization techniques. In some embodiments, operation 103 or 104 may include providing a mode cost based on the selection probability of the current intra mode.

Processing may continue at operation 105, "Determine a Processing Performance Cost for the Mode", where a processing performance cost may be determined for the current block and intra mode. The processing performance cost may include any cost associated with the processing cost of coding the current block using the current intra mode and the processing performance cost may be determined using any suitable technique or techniques. For example, the processing performance cost may be based on the reference block or blocks associated with the current mode and the processing order of the reference block or blocks with respect to the current block.

For example, the blocks of video discussed herein may be processed through the reconstruction loop (transform, quantization, inverse quantization, inverse transform) based on a predetermined or default order such as a Z order walk or the like. Based on the reference block or blocks needed for the current block and intra mode, a determination may be made as to the order the reference block or blocks will be processed with respect to the selected block and a processing performance cost, if any, may be provided accordingly. For example, if a reference block immediately precedes the current block in the processing order, a processing performance cost (e.g., penalty) may be applied to the reference block and selected mode to bias against selecting the current intra mode for processing.

In some embodiments, determining the processing performance cost for the current intra mode may include determining a reference block associated with the current intra mode is immediately prior to the current block in the processing order. For example, with reference to FIG. 2, if the current block is block B3 and the current intra mode is mode 1 (horizontal), please refer to FIG. 4, block B2 may be a reference block. If block B2 is immediately prior to the current block in the processing order, a processing performance cost may be determined Such a processing performance cost may have any suitable value. In an embodiment, if the current block is block B3 and the current intra mode is mode 0 (vertical), please refer to FIG. 4, block B1 may be a reference block. If block B1 is not immediately prior to the current block in the processing order, a zero processing performance cost (e.g., no processing performance cost) may be determined.

In some embodiments, a single reference block may be associated with the current block and current intra mode. In other embodiments, two or more reference blocks may be associated with the current block and current intra mode. In such embodiments, a processing performance cost, if any, may be determined for each reference block and the processing performance costs may be summed to determine the processing performance cost for the current block and intra mode. In an embodiment, a processing performance cost may be provided for a reference block that is immediately prior to the current block in the processing order and, if not, a processing performance cost of zero (e.g., no processing performance cost) may be provided. For example, with reference to FIG. 2, if the current block is block B3 and the current intra mode is mode 2 (DC), please refer to FIG. 4, blocks B1 and B2 may be reference blocks. If block B2 is immediately prior to the current block in the processing order, a processing performance cost may be determined for block B2 and a zero processing performance cost (e.g., no processing performance cost) may be determined for block B1. The processing performance costs for reference blocks B1 and B2 may be summed to provide the processing performance cost fort the current block and intra mode.

In another embodiment, a high processing performance cost may be provided for a reference block that is immediately prior to the current block in the processing order and a lower, non-zero processing performance cost may be provided for a reference block that is prior to the current block with one intervening reference block in the processing order. For example, with reference to FIG. 2, if the current block is block B3 and the current intra mode is mode 2 (DC), please refer to FIG. 4, blocks B1 and B2 may be reference blocks. If block B2 is immediately prior to the current block in the processing order, a processing performance cost may be determined for block B2 and, if block B1 is immediately prior to block B2 in the processing order, a lower, non-zero processing performance cost may be determined for block B1 (e.g., since block B1 is prior to block B3 with block B2 intervening between blocks B3 and B1 in the processing order). The processing performance costs for reference blocks B1 and B2 may be summed to provide the processing performance cost fort the current block and intra mode.

In another embodiment, a high processing performance cost may be provided for a reference block that is immediately prior to the current block in the processing order, a medium processing cost may be provided for a reference block that is prior to the current block with one intervening reference block in the processing order, and a low processing cost may be provided for a reference block that is prior to the current block with two intervening reference block in the processing order. For example, with reference to FIG. 3, if the current block is CU9 and the mode is 0 (horizontal), blocks CU6 and CU8 may be reference blocks. In such an example, CU8 may have a high processing performance cost as it may be immediately prior to CU9 and CU6 may have a low processing cost as it is prior to CU9 with two intervening blocks (e.g., CU7 and CU8).

For example, a reference block closer in the processing order to the current block may have a higher processing performance cost and a reference block further from the current block in the processing order may have a lower processing performance cost. Furthermore, reference blocks prior to the current block with not less than a threshold of intervening blocks may have a zero processing performance cost (e.g., no processing performance cost).

As discussed, for a current block and a current intra mode having multiple reference blocks, the processing performance cost associated with each reference block, if any, may be summed to determine the processing performance cost for the current block and intra mode.

Figure 5:
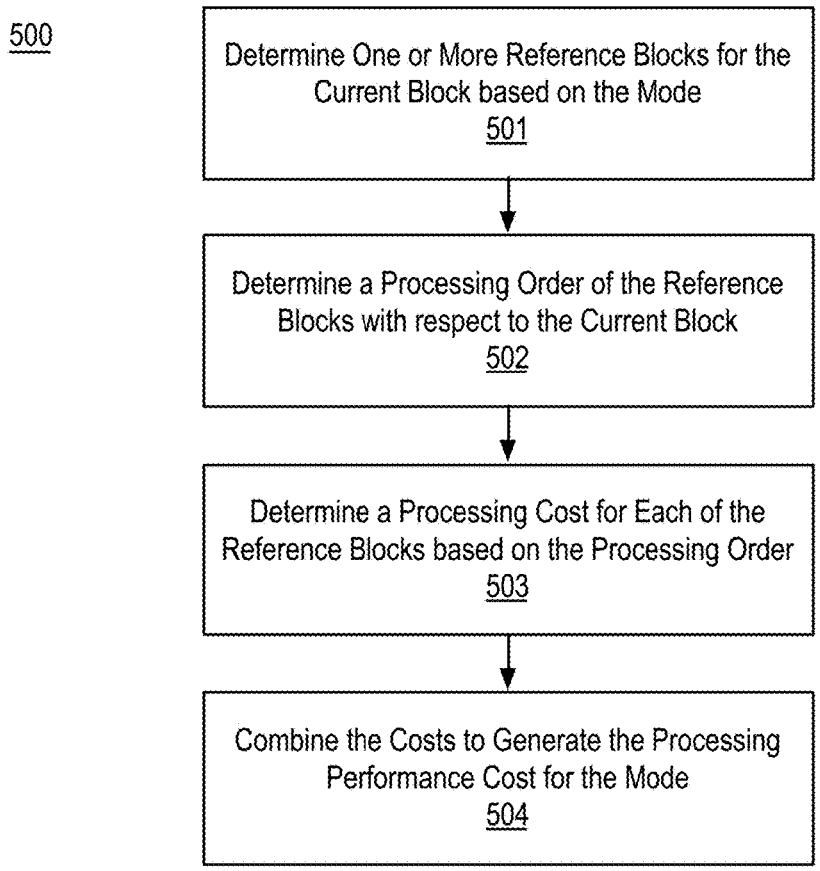
FIG. 5 is a flow diagram illustrating an example process for determining a processing performance cost for a current block and a current mode.

FIG. 5 is a flow diagram illustrating an example process 500 for determining a processing performance cost for a current block and a current mode, arranged in accordance with at least some implementations of the present disclosure. Process 500 may include one or more operations 501-504 as illustrated in FIG. 5. In an embodiment, process 500 may be implemented via operation 105 of process 100.

Process 500 may begin at operation 501, "Determine One or More Reference Blocks for the Current Block based on the Mode", where one or more reference blocks may be determined for the current block and the current mode. The reference blocks for the current block and mode may be determined using any suitable technique or techniques. For example, the reference blocks may be determined for the current block based on the location of the current block, the partition structure of the current frame or slice of video data, and the reference structure of the current mode.

Processing may continue at operation 502, "Determine a Processing Order of the Reference Blocks with respect to the Current Block", where a processing order of the reference blocks with respect to the current block may be determined. For example, the processing order may including the reference block or blocks and any intervening non-reference blocks. In an embodiment, the processing order may begin at the first reference block (e.g., in time) and end at the current block or the block immediately prior to the current block. The processing order may be determined using any suitable technique or techniques. For example, a predetermined or default order may be applied to the partition structure of the current frame or slice of video data beginning at the current block and progressing to the immediately prior block and so on until a first reference block (e.g., in time) is reached.

Processing may continue at operation 503, "Determine a Processing Cost for Each of the Reference Blocks based on the Processing Order", where a processing cost, if any, may be determined for each of the reference blocks based on the processing order. The processing cost for each of the reference blocks may be determined using any suitable technique or techniques and may include any suitable values. For example, any techniques discussed with respect to operation 105 or the like may be used to determine the processing cost for each of the reference blocks.

Processing may continue at operation 504, "Combine the Costs to Generate the Processing Performance Cost for the Mode", where the processing costs for each of the reference blocks may be combined to generate or determine the processing performance cost for the current block and the current mode. The processing costs for each of the reference blocks may be combined using any suitable technique or techniques. In an embodiment, the processing costs for each of the reference blocks may be summed to determine the processing performance cost for the current block and the current mode.

Returning to FIG. 1, processing may continue at operation 106, "Combine the QM, BR Cost, and PPC to Generate a Total Cost for the Mode", where the quality metric (QM), the bit rate (BR) cost, and the processing performance cost (PPC) for the current block and the current mode may be combined to generate a total cost for the current block and the current intra mode. The quality metric, the bit rate cost, and the processing performance cost may be combined using any suitable technique or techniques. In an embodiment, the quality metric, the bit rate cost, and the processing performance cost may be summed to generate the total cost.

Processing may continue at decision operation 107, "Last Available Mode?", where a determination may be made as to whether the current intra mode is the last of the available intra coding modes. If not, processing may continue at operations 102-106 as discussed above for a next intra mode for the current block until a total cost has been determined for each of the available modes. As will be appreciated, some modes may have a zero processing performance cost.

If all available modes have been evaluated, processing may continue at operation 108, "Determine an Intra Coding Mode for the Block", where an intra coding mode may be determined or selected for the block. The intra coding mode may be determined or selected for the block using any suitable technique or techniques. For example, the intra coding mode may be determined or selected for the block based at least in part on the processing performance costs determined at operation 105 for each intra mode. In an embodiment, the intra coding mode may be determined or selected for the block as the intra mode of the available intra modes having the minimum total cost. For example, the processing performance costs for the available intra modes may bias selection away from those modes that will cause processing delays or bubbles during the coding of the intra block.

As shown, processing may continue at operation 109, "Encode", where the block may be encoded into a bitstream. For example, the block may be differenced with a predicted block generated based on the reference blocks or blocks as discussed herein and as defined by the mode associated with the block, the difference may be transformed to the frequency domain, and entropy encoded into the bitstream.

Processing may continue at decision operation 110, "Last Block?", where a determination may be made as to whether the current block is the last block to be processed. If not, processing may continue at operations 101-109 as discussed above for a next block until a mode has been determined for each block to be processed. As will be appreciated, some blocks of a current frame or slice or the like may not be processed via process 100. If the last block has been processed, process 100 may end at end operation 111.

As discussed, process 100 may provide for processing performance costs for available intra modes that bias selection away from those modes that will cause processing delays or bubbles during the coding of the intra block. In an embodiment, the number of blocks having a performance penalty (e.g., any associated performance cost) or the total performance cost may be accumulated and, if the number of blocks having a performance penalty or the total performance cost is not less than a threshold, any intra modes having a performance penalty may be discarded. For example, once the number of blocks having a performance penalty or the total performance cost meets or exceeds a threshold, for any block, any mode having a performance penalty may be discarded and not evaluated for use in coding the associated block.

Figure 6:
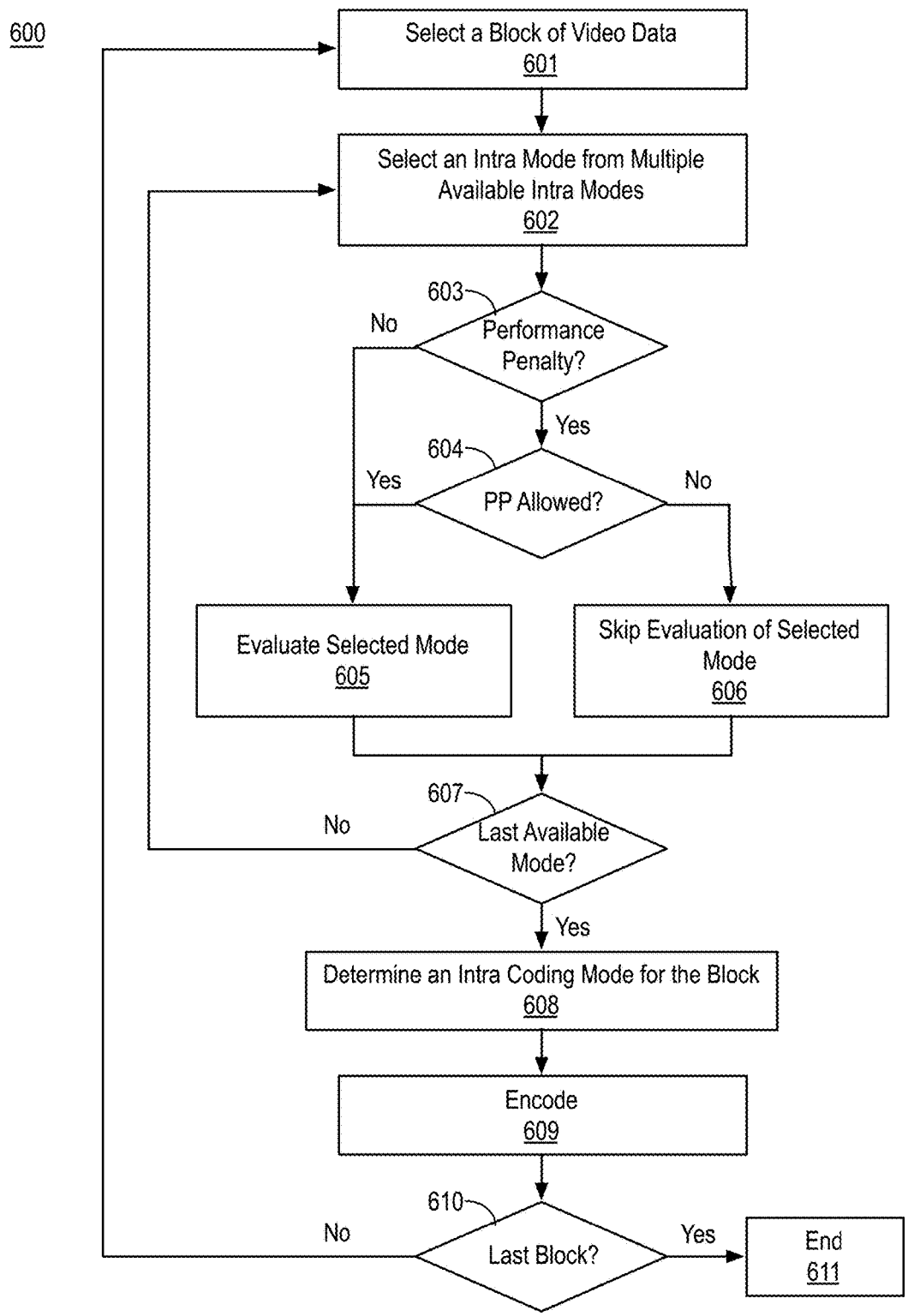
FIG. 6 is a flow diagram illustrating an example process for video encoding including selecting an intra mode based on a processing performance costs threshold.

FIG. 6 is a flow diagram illustrating an example process 600 for video encoding including selecting an intra mode based on a processing performance costs threshold, arranged in accordance with at least some implementations of the present disclosure. Process 600 may include one or more operations 601-611 as illustrated in FIG. 6. Process 600 may be performed by a device (e.g., encoder 700 as discussed herein) to determine an intra mode for a block of a video frame and to encode the block based on the final mode decision. Process 600 may be performed at a coding block or coding unit level and process 600 may be repeated for any number of coding blocks or coding units.

Process 600 may begin at operation 601, "Select a Block of Video Data", where a block of video data may be selected for processing. The block of video data may include any block of video data as discussed herein.

Processing may continue at operation 602, "Select an Intra Mode from Multiple Available Intra Modes", where an intra mode may be selected for evaluation from multiple available intra modes. The available intra modes may include any suitable intra modes as discussed herein.

Processing may continue at decision operation 603, "Performance Penalty?", where a determination may be made as to whether the current intra mode has an associated performance penalty with respect to the current block. Such a determination may be made using any suitable technique or techniques. For example, the reference block or blocks may be determined for the current block and intra mode, the processing order of the reference blocks with respect to the current block may be determined, the processing cost for each of the reference blocks may be determined, and the costs may optionally be combined as discussed with respect to the process 500 and elsewhere herein. As shown, if there is no performance penalty (e.g., processing performance cost) associated with the current block and current intra mode, processing may continue at operation 605 as discussed further herein.

If there is a performance penalty associated with the current block and current intra mode, processing may continue at decision operation 604, "Performance Penalty (PP) Allowed?", where a determination as to whether intra modes having performance penalties are allowed. Such a determination may be made using any suitable technique or techniques. In an embodiment, performance penalties for previous blocks (e.g., within the same macro block or largest coding unit) may be accumulated. For example, if a selected coding mode for a block has an associated processing performance cost, the processing performance cost (e.g., a non-zero processing performance cost) may be added to a processing performance cost accumulator. If the processing performance cost accumulation meets or exceeds a threshold or the like, no additional performance penalty may be allowed. In another embodiment, the number of blocks having performance penalties (e.g., within the same macro block or largest coding unit) may be accumulated or counted. For example, if a selected coding mode for a block has an associated processing performance cost, a processing performance block number accumulator may be incremented. If the processing performance block number meets or exceeds a threshold or the like, no additional performance penalty may be allowed.

As discussed, such an accumulated processing performance cost or accumulated number of blocks having processing performance costs may be used to discard any subsequent intra modes having a processing performance cost for a current block. In some embodiments, such an accumulated processing performance cost or accumulated number of blocks may be implemented for a macroblock or largest coding unit such that the accumulated processing performance cost or accumulated number of blocks is reset after completion of a macroblock or largest coding unit and before a next block in a subsequent macroblock or largest coding unit is processed.

If an additional performance penalty is allowed or if no performance penalty was detected, processing may continue at operation 605, "Evaluate Selected Mode", where the selected intra mode may be evaluated for the current block. For example, the evaluation of the selected intra mode for the current block may include determining a total cost for the mode as discussed with respect to operations 103, 104, 105, and 106 of process 100.

If no additional performance penalty is allowed, processing may continue at operation 606, "Skip Evaluation of Selected Mode", where evaluation of the selected mode may be skipped. For example, such processing may avoid an over accumulation of processing penalties and provide for efficient processing (e.g., by avoiding unnecessary determinations of quality metrics, bit rate costs, and processing performance costs for such intra modes).

As shown, processing may continue from operations 605 or 606 at decision operation 607, "Last Available Mode", where a determination may be made as to whether the current intra mode is the last of the available intra coding modes. If not, processing may continue at operations 602-606 as discussed above for a next intra mode for the current block until a total cost has been determined for each of the available modes.

If all available modes have been evaluated, processing may continue at operation 608, "Determine an Intra Coding Mode for the Block", where an intra coding mode may be determined or selected for the block. The intra coding mode may be determined or selected for the block using any suitable technique or techniques such as those discussed with respect to operation 108 or elsewhere herein.

As shown, processing may continue at operation 609, "Encode", where the block may be encoded into a bitstream. For example, the block may be differenced with a predicted block generated based on the reference blocks or blocks as discussed herein and as defined by the mode associated with the block, the difference may be transformed to the frequency domain, and entropy encoded into the bitstream.

Processing may continue at decision operation 610, "Last Block?", where a determination may be made as to whether the current block is the last block to be processed. If not, processing may continue at operations 601-609 as discussed above for a next block until a mode has been determined for each block to be processed. As will be appreciated, some blocks of a current frame or slice or the like may not be processed via process 600. If the last block has been processed, process 600 may end at end operation 611.

The techniques discussed with respect to processes 100, 500, and 600 may provide increased computational efficiency based on incorporating processing performance costs for some available intra modes.

Figure 7:
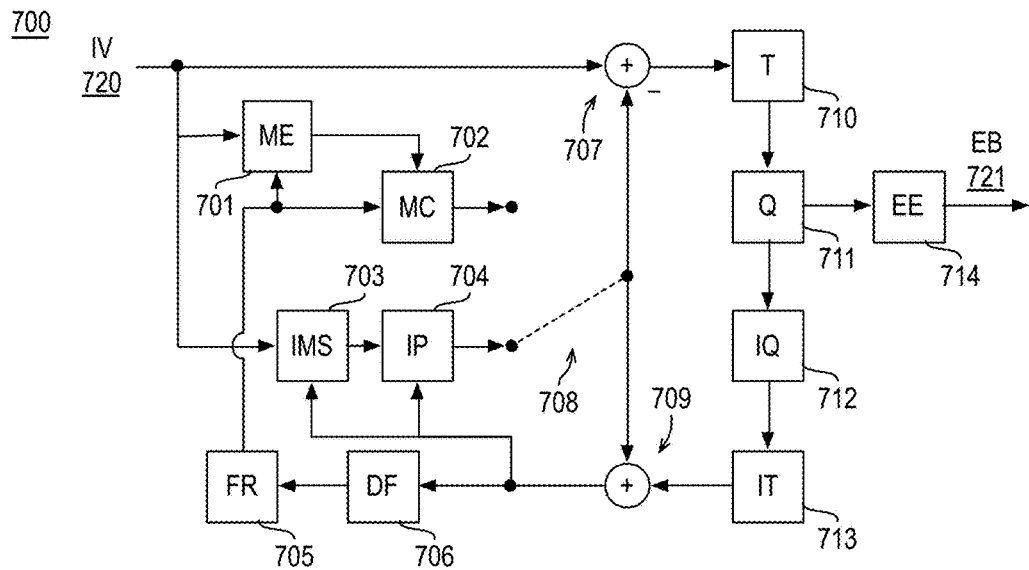
FIG. 7 illustrates a block diagram of an example encoder.

FIG. 7 illustrates a block diagram of an example encoder 700, arranged in accordance with at least some implementations of the present disclosure. As shown, encoder 700 may include a motion estimation (ME) module 701, a motion compensation (MC) module 702, an intra mode selection (IMS) module 703, an intra prediction (IP) module 704, a frame reconstruction (FR) module 705, a deblock filtering (DF) module 706, a differencer 707, a selection switch 708, an adder 709, a transform (T) module 710, a quantization (Q) module 711, an inverse quantization (IQ) module 712, an inverse transform (IT) module 713, and an entropy encoder (EE) module 714. Encoder 700 may include additional modules and/or interconnections that are not shown for the sake of clarity of presentation.

As shown, encoder 700 may receive input video (IV) 720 and encoder 700 may generate an encoded bitstream (EB) 721. Input video 720 may include any suitable input video data such as input video frames or the like in any suitable format. Furthermore, encoded bitstream 721 may include any suitable bitstream such as bitstream that is compliant with a video codec or the like.

For example, encoder 700 may divide a frame of input video 720 into blocks of different sizes, which may be predicted either temporally (inter) via motion estimation module 701 and motion compensation module 702 or spatially (intra) via intra mode selection module 703 and intra prediction module 704. Such a coding decision may be implemented via selection switch 708. Furthermore, after the decision is made as to whether a block is going to be intra or inter coded, a difference with source pixels may be made via differencer 707. The difference may converted to the frequency domain (e.g., based on a discrete cosine transform) via transform module 710 and converted to coefficients via quantization module 711. Such quantized coefficients along with various control signals may be entropy encoded via entropy encoder module 714 to generate encoded bitstream 721, which may be transmitted or transferred or the like to a decoder. Furthermore, the quantized coefficients may be inverse quantized via inverse quantization module 712 and inverse transformed via inverse transform module 713 to generate reconstructed differences or residuals. The reconstructed differences or residuals may be combined with reference blocks via adder 709 to generate reconstructed blocks, which, as shown may be provided to intra mode selection module 703 and intra prediction module 704 for use in intra prediction. Furthermore, the reconstructed differences or residuals may be deblocked via deblock filtering module 706 and reconstructed via frame reconstruction module 705 to generate reconstructed frames, which may be stored in a picture buffer (not shown) and provided to motion estimation module 701 and motion compensation module 702 for use in inter prediction.

As discussed, the processing performance of encoder 700 may be impeded by processing delays or bubbles when intra prediction module 704 must wait for reconstructed blocks. For example, the performance of the intra loop including transform module 710, quantization module 711, inverse quantization module 712, and inverse transform module 713, which may be implemented via an encoder pipeline or the like, may be limited when such delays are present. In some embodiments, intra mode selection module 703 and/or intra prediction module 704 may implement the operations discussed herein to select and implement intra modes that eliminate or reduce such processing delays.

For example, intra mode selection module 703 and/or intra prediction module 704 may perform any of operations 101-108, 501-504, 601-609 or the like to generate a selected intra mode for a block of video data and intra prediction module 704 may perform at least a portion of operation 109 or operation 609 to encode the block of video data based on the selected intra mode.

The techniques discussed with respect to processes 100, 500, and 600 may provide increased computational efficiency based on incorporating processing performance costs for some available intra modes. In other embodiments, a block encode order may be determined for multiple blocks based on intra modes associated with the blocks such that the block encode order is different than a default block coding order. Such ordering of block encoding may eliminate or reduce processing delays or bubbles. Subsequent to encoding the blocks based on the block encode order, the encoded blocks may be re-ordered based on the default block coding order and encoded such that the blocks are received in the default order via the bitstream at a decoder.

Figure 8:
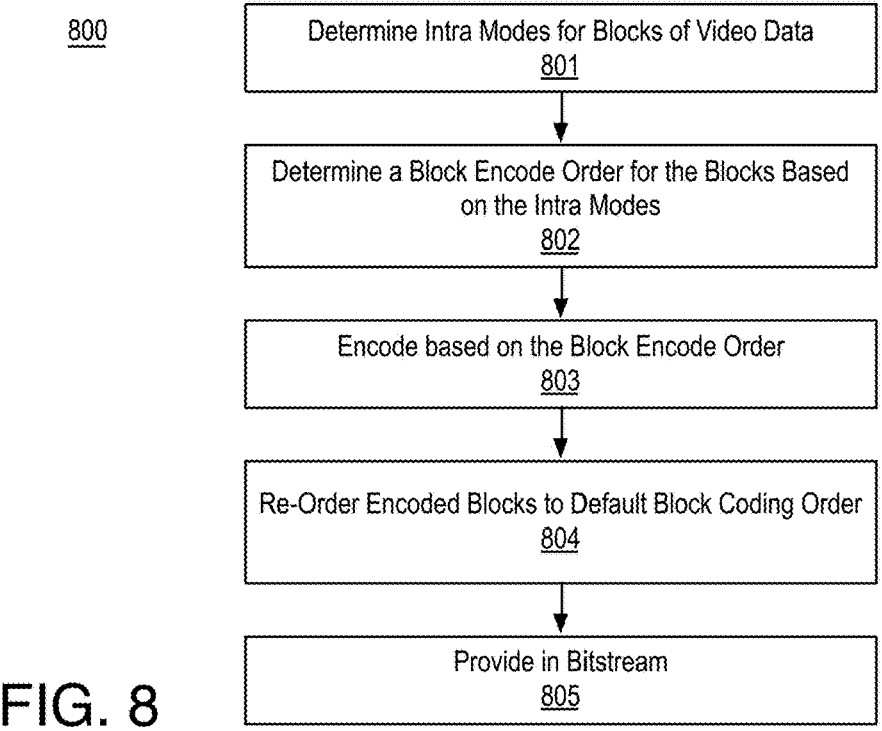
FIG. 8 is a flow diagram illustrating an example process for video encoding including ordering blocks into a block encode order for encoding.

FIG. 8 is a flow diagram illustrating an example process 800 for video encoding including ordering blocks into a block encode order for encoding, arranged in accordance with at least some implementations of the present disclosure. Process 800 may include one or more operations 801-805 as illustrated in FIG. 8. Process 800 may be performed by a device (e.g., encoder 1000 as discussed herein) to determine a block encode order (e.g., different than a default block coding order) for blocks previously assigned intra modes, to encode the blocks based on the block encode order, to re-order the encoded blocks based on the default block coding order, and to provide the re-ordered encoded blocks via a bitstream. Process 800 may be repeated for any number of groups of blocks such as any number of macroblocks or largest coding units or the like.

Process 800 may begin at operation 801, "Determine Intra Modes for Blocks of Video Data", where intra modes may be determined for blocks of video data. The blocks of video data may include any blocks of video data (e.g., of a frame or slice or the like of video data) that may be intra coded as discussed herein. For example, in the context of the H.264/MPEG-4 Advanced Video Coding (AVC) standard, the blocks may be macroblock partitions of a macroblock or macroblocks. In the context of the High Efficiency Video Coding (HEVC), the blocks may be coding units. Such coding units may be used as the basic unit or block for intra coding. However, as discussed, the block of video data may include any block of video data that may be intra coded. Furthermore, the group of blocks processed via operations 801-805 may be any suitable group of blocks. In some embodiments, the group may be a macroblock (e.g., of macroblock partitions) or a largest coding unit (e.g., of coding units) In other embodiments, the group may be a region of blocks, a slice of blocks, or a frame of blocks. In some embodiments, the reordering discussed with respect to process 800 may be performed at a sub-block level (e.g., smaller than a block level). For example, the reordering may be performed on 4×4 blocks within a macroblock.

Processing may continue at operation 802, "Determine Block Encode Order for the Blocks Based on the Intra Modes", where a block encode order may be determined for the intra blocks based on the intra modes determined at operation 801. The block encode order may be determined using any suitable technique or techniques and may include a block encode order that is different than a default block coding order. For example, the block encode order may provide for the elimination or reduction of processing delays or bubbles with respect the determined intra modes and the default block coding order. In some embodiments, the default block coding order may be a Z order walk and the block encode order may include a modification to the Z order walk to eliminate or reduce processing delays or bubbles when coding the blocks.

For example, with reference to FIG. 2, a default block coding order of blocks may be B0, B1, B2, B3. Furthermore, if, for example, block B0 is mode 2 (DC) with reference blocks not shown, block B1 is mode 0 (horizontal) with a reference block of B0, block B2 is mode 0 (horizontal) with a reference block not shown, and block B3 is mode 0 (horizontal) with a reference block B2, the processing order of B0, B1, B2, B3 would provide for a reference block B0 immediately prior to its dependent block B1, and a reference block B2 immediately prior to its dependent block B3. In such an example, for the processing the first instance of a reference block immediately prior to a dependent block, the block order may be switched (e.g., so long as no dependent blocks are moved prior to reference blocks). Continuing the above example, the processing order of blocks B1 and B2 may be switched to provide a block encode order of B0, B2, B1, B3. In such an order no reference blocks are immediately prior to their associated dependent blocks and no dependent blocks are prior to their associated reference blocks. Such a block encode order may eliminate or reduce a processing delay or bubble (e.g., the wait to process blocks B1 and B3 may be reduced or eliminated). Such delay or bubble elimination may save substantial processing time.

As discussed, in some embodiments, the block encode order may provide an order of the blocks such that each reference block in the blocks is ordered prior to and with at least one intervening block with respect to every dependent block associated with the reference block. Furthermore, as discussed, a constraint may be provided such that reference blocks must be before their associated dependent blocks such that the reference blocks are available for coding their associated dependent blocks. In some examples, it may not be possible to order all reference blocks prior to and with one or more intervening blocks with respect to the dependent blocks associated with the reference block. In such examples, the block encode order may provide an order of the blocks such that a minimum number of reference block and immediately following dependent blocks is provided. Furthermore, in some examples, it may be possible to provide more than one intervening block between one or more reference block and their associated dependent blocks. In such examples, the block encode order may first provide at least intervening block between the reference block and associated dependent blocks and then provide more intervening blocks between one or more reference blocks and associated dependent blocks.

As discussed, the block encode order may be determined using any suitable technique or techniques. In some embodiments, multiple available block encode orders may be generated and the available block encode orders may be tested based on one or more criteria to determine the block encode order. For example, the block encode order may meet a criteria that at least one intervening block is provided with respect to every dependent block and associated reference block. In some embodiments, the multiple available block encode orders may include any block encode order that provides reference blocks prior to their associated dependent blocks. Such a constraint must be provided, for example, so dependent blocks always have their necessary reference blocks for performing coding. In some embodiments, the selected block encode order may be the encode order of the multiple available block encode orders that provides the fewest number of reference blocks immediately prior to associated dependent blocks. In some embodiments, the selected block encode order may be the encode order of the multiple available block encode orders that provides the greatest number of intervening blocks between reference blocks and their associated dependent blocks. In another embodiment, the default block coding order may be tested and, if needed, modified to generate the block encode order.

Figure 9:
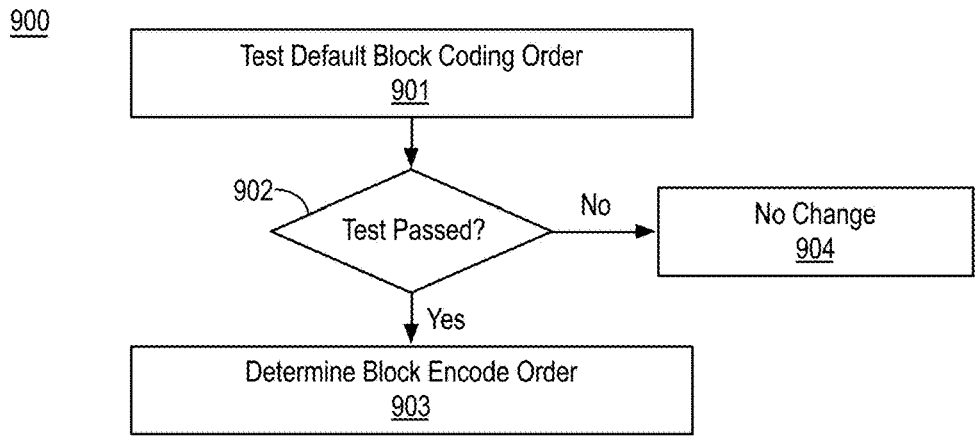
FIG. 9 is a flow diagram illustrating an example process for generating a block encode order based on a default block coding order.

FIG. 9 is a flow diagram illustrating an example process 900 for generating a block encode order based on a default block coding order, arranged in accordance with at least some implementations of the present disclosure. Process 900 may include one or more operations 901-904 as illustrated in FIG. 9. In an embodiment, process 900 may be implemented via operation 802 of process 800.

Process 900 may begin at operation 901, "Test Default Block Coding Order", where the default block coding order may be tested. The default block coding order may be tested using any suitable technique or techniques to determine whether it may cause processing delays or bubbles. In an embodiment, the default block coding order may be tested to determine whether any reference blocks immediately precede their associated dependent blocks. For example, the test may determine the default block coding order has at least one reference block immediately prior to a dependent block dependent upon the reference block.

Processing may continue at decision operation 902, "Test Passed", where a determination may be made as to whether the test performed at operation 901 passed. If so, processing may continue at operation 904, "No Change", where no change may be made to the default block coding order and the default block coding order may be used for processing the blocks.

If the test was not passed, processing may continue at operation 903, "Determine Block Encode Order", where a block encode order may be determined. The block encode order may be determined using any suitable technique or techniques. In some embodiments, the block encode order may be determine using the techniques discussed with respect to operation 802 (e.g., generating multiple available block encode orders and selecting the block encode order from the multiple available block encode orders based on one or more criteria). In another embodiment, an intervening block may be provided between the reference block and the dependent block that are immediately adjacent to one another. Such a process of providing intervening blocks may be provided for each combination of immediately adjacent reference and dependent blocks until such an intervening block may not be provided (e.g., due to ordering constraints or the like).

Returning to FIG. 8, processing may continue at operation 803, "Encode based on the Encode Order", where encoding may be performed for blocks based on the block encode order to generate encoded blocks associated with the plurality of blocks. For example, encoding may include an encode pipeline that provides differencing (e.g., between the current dependent block and predicted pixels based on the reference block or blocks), transform to the frequency domain, and quantization. For example, encoding may generate encoded blocks of coefficients that may be entropy encoded and inserted into a bitstream.

Processing may continue at operation 804, "Re-Order Encoded Blocks to Default Block Coding Order", where the encoded blocks generated at operation 803 may be re-ordered based on the default coding. order. The encoded blocks may be re-ordered using any suitable technique or techniques. For example, re-ordering may be necessary such that an encoded bitstream includes the encoded blocks in an order expected by a decoder. As discussed, in some examples, the block encode order may be the same as the default block coding order and, in such examples, operation 804 may be skipped.

Processing may continue at operation 805, "Provide in Bitstream", where the re-ordered encoded blocks may be provided in a bitstream. For example, the re-ordered encoded blocks may be entropy coded and inserted into a bitstream such as a compliant bitstream.

Figure 10:
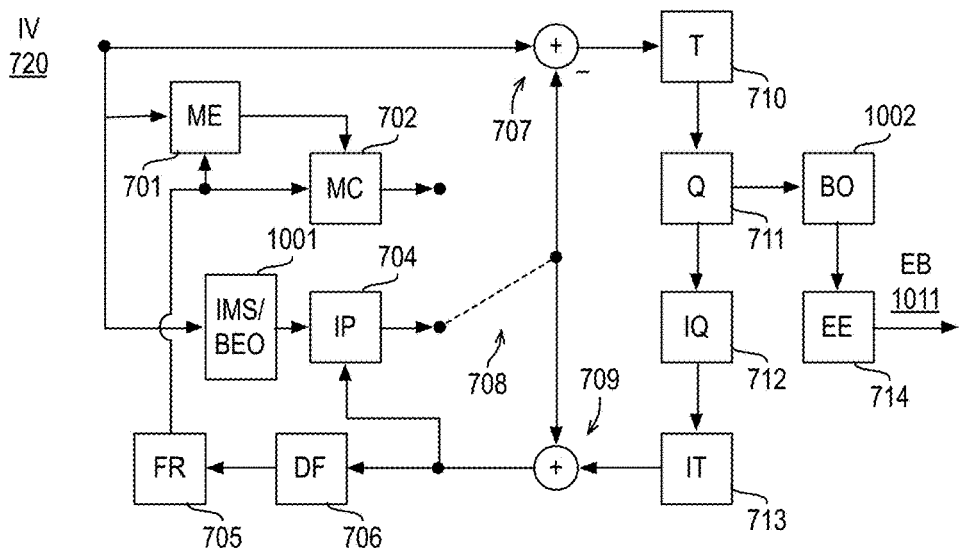
FIG. 10 illustrates a block diagram of an example encoder.

FIG. 10 illustrates a block diagram of an example encoder 1000, arranged in accordance with at least some implementations of the present disclosure. As shown, encoder 1000 may include motion estimation (ME) module 701, motion compensation (MC) module 702, an intra mode selection (IMS) and block encode order (BEO) module 1001, intra prediction (IP) module 704, frame reconstruction (FR) module 705, deblock filtering (DF) module 706, differencer 707, selection switch 708, adder 709, transform (T) module 710, quantization (Q) module 711, inverse quantization (IQ) module 712, inverse transform (IT) module 713, a block ordering (BO) module 1002, and entropy encoder (EE) module 714. Encoder 1000 may include additional modules and/or interconnections that are not shown for the sake of clarity of presentation.

As shown, encoder 1000 may receive input video (IV) 720 and encoder 1000 may generate an encoded bitstream (EB) 1011. Input video 720 may include any suitable input video data such as input video frames or the like in any suitable format. Furthermore, encoded bitstream 1011 may include any suitable bitstream such as bitstream that is compliant with a video codec or the like. For example, as discussed with respect to encoder 700, encoder 1000 may divide a frame of input video 720 into blocks of different sizes, which may be predicted either temporally (inter) via motion estimation module 701 and motion compensation module 702 or spatially (intra) via intra mode selection module 1003 and intra prediction module 704. Such a coding decision may be implemented via selection switch 708. Furthermore, after the decision is made as to whether a block is going to be intra or inter coded, a difference with source pixels may be made via differencer 707. The difference may converted to the frequency domain via transform module 710 and converted to coefficients via quantization module 711. Such quantized coefficients along with various control signals may be entropy encoded via entropy encoder module 714 to generate encoded bitstream 721, which may be transmitted or transferred or the like to a decoder. In some examples, intra coded blocks having a block encode order, as implemented via intra mode selection and block encode order module 1001, different than a default coding order and encoded via differencer 707, transform module 710, and quantization module 711 may be re-ordered to the default coding order via block ordering module 1002 prior to entropy encoding via entropy encoder module 714.

Furthermore, the quantized coefficients may be inverse quantized via inverse quantization module 712 and inverse transformed via inverse transform module 713 to generate reconstructed differences or residuals. The reconstructed differences or residuals may be combined with reference blocks via adder 709 to generate reconstructed blocks, which, as shown may be provided to intra prediction module 704 for use in intra prediction. As shown, in some embodiments, such reconstructed blocks may not be provided to intra mode selection and block encode order module 1001 such that intra mode selection is based only on source pixels provided via input video 720. Furthermore, the reconstructed differences or residuals may be deblocked via deblock filtering module 706 and reconstructed via frame reconstruction module 705 to generate reconstructed frames, which may be stored in a picture buffer (not shown) and provided to motion estimation module 701 and motion compensation module 702 for use in inter prediction.

As discussed, the processing performance of encoder 700 may be impeded by processing delays or bubbles when intra prediction module 704 must wait for reconstructed blocks. For example, the performance of the intra loop including intra prediction module 704, differencer 707, transform module 710, quantization module 711, inverse quantization module 712, and inverse transform module 713, which may be implemented via an encoder pipeline or the like, may be limited when such delays are present. In some embodiments, intra mode selection and block encode order module 1001 and/or intra prediction module 704 may implement the operations discussed herein to select and implement block encode orders that eliminate or reduce such processing delays.

For example, intra mode selection and block encode order module 1001 and/or intra prediction module 704 may perform any of operations 801-805, 901-904, associated operations, or the like to generate a block coding order for blocks of video data and intra prediction module 704 may perform at least a portion of operation 805 to encode the block of video data based on the selected intra mode.

The techniques discussed with respect to processes 800 and 900 may provide increased computational efficiency based on providing improved block encoding orders for some blocks of video data.

The techniques discussed herein may provide configurable intra coding performance enhancements for video coding.

Figure 11:
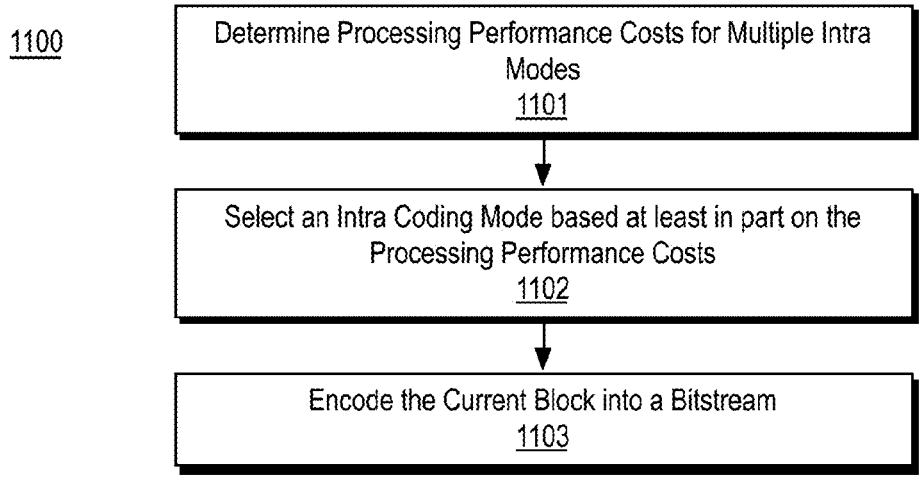
FIG. 11 is a flow diagram illustrating an example process for video coding.

FIG. 11 is a flow diagram illustrating an example process 1100 for video coding, arranged in accordance with at least some implementations of the present disclosure. Process 1100 may include one or more operations 1101-1103 as illustrated in FIG. 11. Process 1100 may form at least part of a video coding process. By way of non-limiting example, process 1100 may form at least part of a video coding process performed by encoder 700 as discussed herein. Furthermore, process 1100 will be described herein with reference to system 1300 of FIG. 13.

Figure 12:
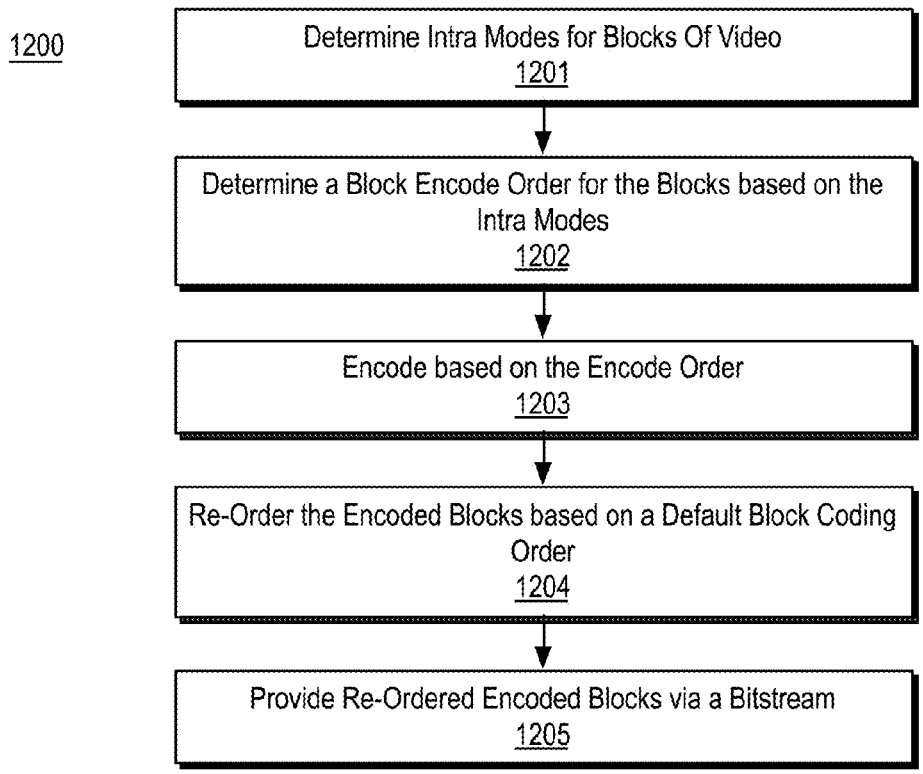
FIG. 12 is a flow diagram illustrating an example process for video coding.

FIG. 12 is a flow diagram illustrating an example process 1200 for video coding, arranged in accordance with at least some implementations of the present disclosure. Process 1200 may include one or more operations 1201-1205 as illustrated in FIG. 12. Process 1200 may form at least part of a video coding process. By way of non-limiting example, process 1200 may form at least part of a video coding process performed by encoder 1000 as discussed herein. Furthermore, process 1200 will be described herein with reference to system 1300 of FIG. 13.

Figure 13:
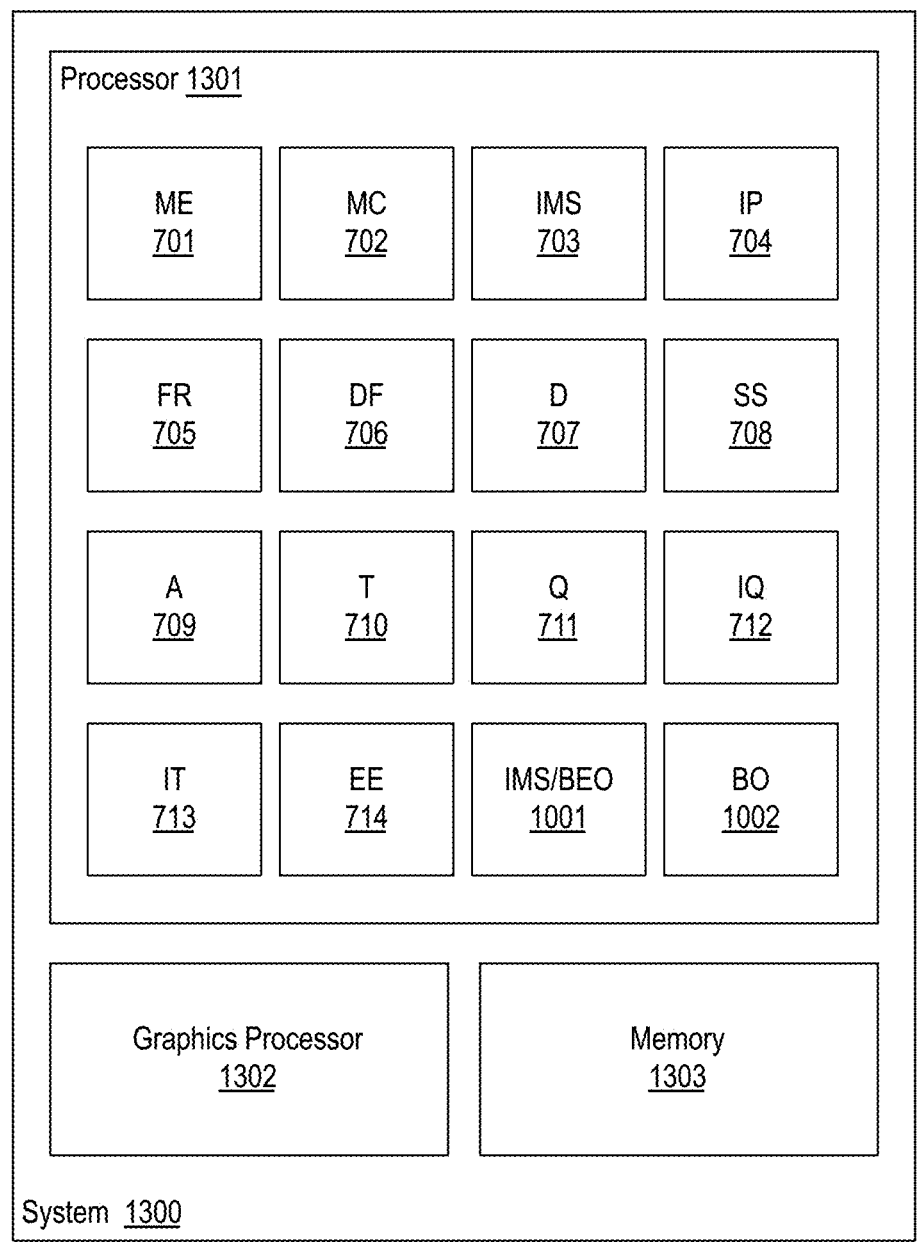
FIG. 13 is an illustrative diagram of an example system for video encoding

FIG. 13 is an illustrative diagram of an example system 1300 for video encoding, arranged in accordance with at least some implementations of the present disclosure. As shown in FIG. 13, system 1300 may include one or more processors 1301, a graphics process or 1302, and a memory 1303. Also as shown, processor 1301 may include motion estimation (ME) module 701, motion compensation (MC) module 702, intra mode selection (IMS) module 703, intra prediction (IP) module 704, frame reconstruction (FR) module 705, deblock filtering (DF) module 706, differencer (D) 707, selection switch (SS) 708, adder (A) 709, transform (T) module 710, quantization (Q) module 711, inverse quantization (IQ) module 712, inverse transform (IT) module 713, entropy encoder (EE) module 714, intra mode selection (IMS) and block encode order (BEO) module 1001, and block ordering (PO) module 1002.

As shown, in some embodiments, system 1300 includes intra mode selection module 703, intra mode selection and block encode order module 1001, and block ordering module 1002. In an embodiment, system 1300 includes intra mode selection module 703 and does not include intra mode selection and block encode order module 1001 and block ordering module 1002. In another embodiment, system 1300 includes intra mode selection and block encode order module 1001 and block ordering module 1002 and does not include intra mode selection module 703.

Such modules and components may be implemented to perform operations as discussed herein. In the example of system 1300, memory 1303 may store video data, frames of video data, slices of video data, blocks of video data, intra modes, selected intra modes, quality metrics, bit rate costs, processing performance costs, total costs, processing orders, processing performance cost accumulations, processing performance block number accumulations, threshold data, available block coding orders, default block coding orders, any encode or signaling data, or any other data as discussed herein.

As shown, in some examples, the illustrated modules and components may be implemented via processor 1301. In other examples, one or more or portions of the illustrated modules and components may be implemented via graphics processor 1302. In yet other examples, one or more or portions of the illustrated modules and components may be implemented via an encode pipeline and/or an imaging processing unit.

Graphics processor 1302 may include any number and type of graphics processing units that may provide the operations as discussed herein. Such operations may be implemented via software or hardware or a combination thereof. For example, graphics processor 1302 may include circuitry dedicated to manipulate frame or video data obtained from memory 1303. Processor 1301 may include any number and type of processing units or modules that may provide control and other high level functions for system 1300 and/or provide any operations as discussed herein. Memory 1303 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1303 may be implemented by cache memory. In an embodiment, one or more or portions of the illustrated modules and components may be implemented via an execution unit (EU) of graphics processor 1302. The EU may include, for example, programmable logic or circuitry such as a logic core or cores that may provide a wide array of programmable logic functions. In an embodiment, one or more or portions of the illustrated modules and components may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 11, process 1100 may begin at operation 1101, "Determine Processing Performance Costs for Multiple Intra Modes", where, for a current block of video data, processing performance costs may be determined for multiple intra modes such that the processing performance costs are based on one or more reference blocks associated with the multiple intra modes and a processing order of the one or more reference blocks with respect to the current block. The processing performance costs may be determined using any suitable technique or techniques such as those discussed herein. In an embodiment, the performance costs may be determined by intra mode selection module 703 as implemented via processor 1301.

In some embodiments, determining the processing performance cost for an intra mode of the multiple intra modes may include determining a reference block associated with the intra mode is immediately prior to the current block in the processing order. In some embodiments, determining the processing performance cost for an intra mode of the multiple intra modes may include determining a first cost based on a first reference block associated with the intra mode and a second cost based on a second reference block associated with the intra mode and summing the first and second costs to determine the processing performance cost for the first intra mode. In some embodiments, determining the processing performance cost for an intra mode of the multiple intra modes may include determining a reference block associated with the intra mode is immediately prior to the current block in the processing order or prior to the current block with one or more intervening reference blocks in the processing order and assigning a performance cost to the intra mode when the reference block is immediately prior to the current block and assigning a zero performance cost to the intra mode when the reference block is prior to the current block with one or more intervening reference blocks.

In some embodiments, determining the processing performance cost for an intra mode of the multiple intra modes may include determining a reference block associated with the intra mode is immediately prior to the current block in the processing order, prior to the current block with one intervening reference block in the processing order, or prior to the current block with two intervening reference blocks in the processing order and assigning a high performance cost to the intra mode when the reference block is immediately prior to the current block, assigning a medium performance cost to the intra mode when the reference block is prior to the current block with one intervening reference block, and assigning a low performance cost to the intra mode when the reference block is prior to the current block with two intervening reference blocks.

In some embodiments, process 1100 may further include adding to a processing performance cost accumulator when the intra coding mode has a non-zero processing performance cost and rejecting any intra modes having a non-zero processing performance cost for a subsequent block of the video data when the processing performance cost block accumulator exceeds a threshold. The processing performance cost accumulator may accumulate a total amount of processing performance cost, a number of blocks having performance costs, or the like.

Processing may continue at operation 1102, "Select an Intra Coding Mode based at least in part on the Processing Performance Costs", where an intra coding mode may be selected for the current block based at least in part on the processing performance costs for the multiple intra modes. In an embodiment, the intra coding mode may be selected via intra mode selection module 703 as implemented via processor 1301. In some embodiments, selecting the intra coding mode for the current block may be further based on quality metrics and bit rate costs associated with the plurality of intra modes. For example, the intra coding mode may be selected as a coding mode associated with a minimum total cost of total costs associated with the multiple intra coding modes. The total costs may include contributions from quality metrics, bit rate costs, and processing performance costs.

Processing may continue at operation 1103, "Encode the Current Block into a Bitstream", where the current block may be encoded into a bitstream. In an embodiment, the current block may be encoded via differencer 707, transform module 710, quantization module 711, and entropy encoder module 714 as implemented via processor 1301. Such encoding may be implemented via any suitable technique or techniques.

Process 1100 may be repeated any number of times either in series or in parallel for any number of blocks of video data, video frames, or the like. Process 1100 may provide for increased coding performance based on eliminated or reduced processing delays in intra coding.

Turning now to discussion of FIG. 12, process 1200 may begin at operation 1201, "Determine Intra Modes for Blocks Of Video", where an individual intra mode may be determined for each block of multiple blocks of video data. The intra modes may be determined using any suitable technique or techniques such as rate distortion techniques or the like. In an embodiment, the intra modes may be determined by intra mode selection and block encode order module 1001 as implemented via processor 1301. In some embodiments, determining the intra mode for each block may include determining the intra mode based on source pixel data.

Processing may continue at operation 1202, "Determine a Block Encode Order for the Blocks based on the Intra Modes", where a block encode order may be determined for the multiple blocks based on the intra modes such that the block encode order is different than a default block coding order. In an embodiment, the block encode order may be determined by intra mode selection and block encode order module 1001 as implemented via processor 1301. The block encode order may include any suitable block order and the block encode order may be determined using any suitable technique or techniques. In some embodiments, the block encode order may include an order of the multiple blocks such that each reference block in the multiple blocks is ordered prior to and with at least one intervening block with respect to every dependent block associated with the reference block.

In some embodiments, determining the block encode order may include testing the default block coding order to determine a reference block is immediately prior to a dependent block dependent upon the reference block and providing an intervening block between the reference block and the dependent block. In some embodiments, the default block coding order may include a Z order walk and the block encode order may include a modification to the Z order walk such as a change in an order of the blocks to insert an intervening block between immediately adjacent reference and dependent blocks. In some embodiments, determining the block encode order may include testing available block encode orders and selecting the block encode order from the available block encode orders based on each reference block in the plurality of blocks being ordered prior to and with at least one intervening block with respect to every dependent block associated with the reference block.

Processing may continue at operation 1203, "Encode based on the Encode Order", wherein encoding may be performed for the multiple blocks based on the block encode order to generate encoded blocks associated with the plurality of blocks. The encoding may be performed using any suitable technique or techniques and may include any operations that generate encoded coefficients representative of differences associated with the blocks. In some embodiments, such encoding may include an encode pipeline that provides differencing (e.g., between the current dependent block and predicted pixels based on the reference block or blocks), transform to the frequency domain, and quantization. In an embodiment, encoding may be provided by differencer 707, transform module 710, and quantization module 711 as implemented via processor 1301.

Processing may continue at operation 1204, "Re-Order the Encoded Blocks based on a Default Block Coding Order", where the encoded blocks may be re-ordered based on the default block coding order. The encoded blocks may be re-ordered using any suitable technique or techniques. For example, re-ordering may be necessary such that an encoded bitstream includes the encoded blocks in an order expected by a decoder. In an embodiment the encoded blocks may be re-ordered by block ordering module 1002 as implemented via processor 1301.

Processing may continue at operation 1205, "Provide Re-Ordered Encoded Blocks via a Bitstream", where the re-ordered encoded blocks may be provided via a bitstream. The re-ordered encoded blocks may be provided via a bitstream using any suitable technique or techniques. For example, the re-ordered encoded blocks may be entropy coded and inserted into a bitstream such as a compliant bitstream. In an embodiment the re-ordered encoded blocks may be entropy coded and inserted into a bitstream by entropy encoder module 714 as implemented via processor 1301

Process 1200 may be repeated any number of times either in series or in parallel for any number of blocks of video data, video frames, or the like. Process 1200 may provide for increased coding performance based on eliminated or reduced processing delays in intra coding.

Various components of the systems described herein may be implemented in software, firmware, and/or hardware and/or any combination thereof. For example, various components of the systems described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100 or 1700, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 14:
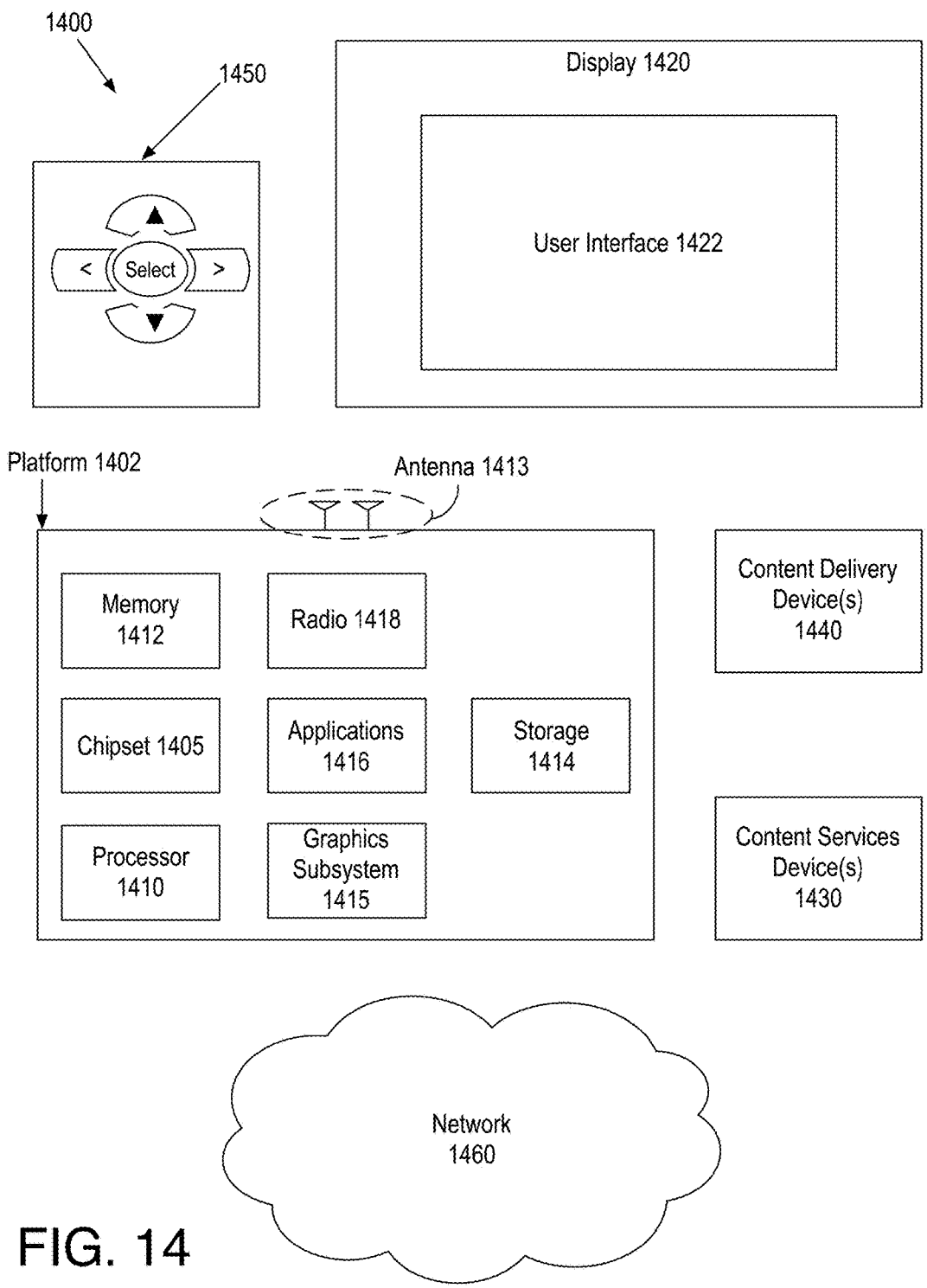
FIG. 14 is an illustrative diagram of an example system.

FIG. 14 is an illustrative diagram of an example system 1400, arranged in accordance with at least some implementations of the present disclosure. In various implementations, system 1400 may be a computing system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, antenna 1413, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, DisplayPort, wireless HDMI, and/or wireless HD compliant techniques. Graphics subsystem 1415 may be integrated into processor 1410 or chipset 1405. In some implementations, graphics subsystem 1415 may be a stand-alone device communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of uni-directionally or bi-directionally communicating content between content providers and platform 1402 and/display 1420, via network 1460 or directly. It will be appreciated that the content may be communicated uni-directionally and/or bi-directionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of navigation controller 1450 may be used to interact with user interface 1422, for example. In various embodiments, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In various embodiments, navigation controller 1450 may not be a separate component but may be integrated into platform 1402 and/or display 1420.

The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
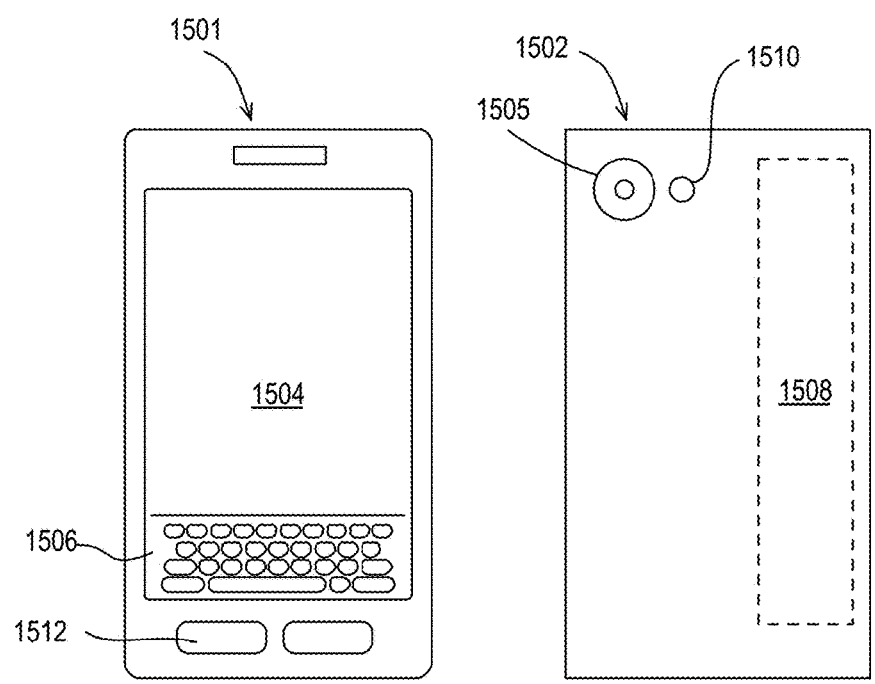
FIG. 15 illustrates an example small form factor device, all arranged in accordance with at least some implementations of the present disclosure.

As described above, system 1400 may be embodied in varying physical styles or form factors. FIG. 15 illustrates an example small form factor device 1500, arranged in accordance with at least some implementations of the present disclosure. In some examples, system 1400 may be implemented via device 1500. In other examples, any system as discussed herein may be implemented via device 1500. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eye-glass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing with a front 1501 and a back 1502. Device 1500 includes a display 1504, an input/output (I/O) device 1506, and an integrated antenna 1508. Device 1500 also may include navigation features 1512. I/O device 1506 may include any suitable I/O device for entering information into a mobile computing device. Examples for I/O device 1506 may include an alphanumeric keyboard, a numeric keypad, a touch pad, input keys, buttons, switches, microphones, speakers, voice recognition device and software, and so forth. Information also may be entered into device 1500 by way of microphone (not shown), or may be digitized by a voice recognition device. As shown, device 1500 may include a camera 1505 (e.g., including a lens, an aperture, and an imaging sensor) and a flash 1510 integrated into back 1502 (or elsewhere) of device 1500. In other examples, camera 1505 and flash 1510 may be integrated into front 1501 of device 1500 or both front and back cameras may be provided. Camera 1505 and flash 1510 may be components of a camera module to originate image data processed into streaming video that is output to display 1504 and/or communicated remotely from device 1500 via antenna 1508 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for video coding comprises determining, for a current block of video data, processing performance costs for a plurality of intra modes, wherein the processing performance costs are based on one or more reference blocks associated with the plurality of intra modes and a processing order of the one or more reference blocks with respect to the current block, selecting an intra coding mode for the current block based at least in part on the processing performance costs for the plurality of intra modes, and encoding the current block into a bitstream based at least in part on the selected intra coding mode.

Further to the first embodiments, the method further comprises adding to a processing performance cost accumulator when the intra coding mode has a non-zero processing performance cost and rejecting any intra modes having a non-zero processing performance cost for a subsequent block of the video data when the processing performance cost block accumulator exceeds a threshold.

Further to the first embodiments, determining the processing performance cost for a first intra mode of the plurality of intra modes comprises determining a first reference block associated with the first intra mode is immediately prior to the current block in the processing order.

Further to the first embodiments, determining the processing performance cost for a first intra mode of the plurality of intra modes comprises determining a first cost based on a first reference block associated with the first intra mode and a second cost based on a second reference block associated with the first intra mode and summing the first and second costs to determine the processing performance cost for the first intra mode.

Further to the first embodiments, determining the processing performance cost for a first intra mode of the plurality of intra modes comprises determining a first reference block associated with the first intra mode is at least one of immediately prior to the current block in the processing order or prior to the current block with one or more intervening reference blocks in the processing order and assigning a performance cost to the first intra mode when the first reference block is immediately prior to the current block and assigning a zero performance cost to the first intra mode when the first reference block is prior to the current block with one or more intervening reference blocks.

Further to the first embodiments, determining the processing performance cost for a first intra mode of the plurality of intra modes comprises determining a first reference block associated with the first intra mode is at least one of immediately prior to the current block in the processing order, prior to the current block with one intervening reference block in the processing order, or prior to the current block with two intervening reference blocks in the processing order and assigning a high performance cost to the first intra mode when the first reference block is immediately prior to the current block, assigning a medium performance cost to the first intra mode when the first reference block is prior to the current block with one intervening reference block, and assigning a low performance cost to the first intra mode when the first reference block is prior to the current block with two intervening reference blocks.

Further to the first embodiments, selecting the intra coding mode for the current block is further based on quality metrics and bit rate costs associated with the plurality of intra modes.

In one or more second embodiments, a system for video coding comprises a memory to store a blocks of video data and a processor coupled to the memory, the processor to determine, for a current block of video data, processing performance costs for a plurality of intra modes, wherein the processing performance costs are based on one or more reference blocks associated with the plurality of intra modes and a processing order of the one or more reference blocks with respect to the current block, select an intra coding mode for the current block based at least in part on the processing performance costs for the plurality of intra modes, and encode the current block into a bitstream based at least in part on the selected intra coding mode.

Further to the second embodiments, wherein the processor is further to add to a processing performance cost accumulator when the intra coding mode has a non-zero processing performance cost and reject any intra modes having a non-zero processing performance cost for a subsequent block of the video data when the processing performance cost block accumulator exceeds a threshold.

Further to the second embodiments, the processor to determine the processing performance cost for a first intra mode of the plurality of intra modes comprises the processor to determine a first reference block associated with the first intra mode is immediately prior to the current block in the processing order.

Further to the second embodiments, the processor to determine the processing performance cost for a first intra mode of the plurality of intra modes comprises the processor to determine a first cost based on a first reference block associated with the first intra mode and a second cost based on a second reference block associated with the first intra mode and sum the first and second costs to determine the processing performance cost for the first intra mode.

Further to the second embodiments, the processor to determine the processing performance cost for a first intra mode of the plurality of intra modes comprises the processor to determine a first reference block associated with the first intra mode is at least one of immediately prior to the current block in the processing order or prior to the current block with one or more intervening reference blocks in the processing order and assign a performance cost to the first intra mode when the first reference block is immediately prior to the current block and assigning a zero performance cost to the first intra mode when the first reference block is prior to the current block with one or more intervening reference blocks.

Further to the second embodiments, the processor to determine the processing performance cost for a first intra mode of the plurality of intra modes comprises the processor to determine a first reference block associated with the first intra mode is at least one of immediately prior to the current block in the processing order, prior to the current block with one intervening reference block in the processing order, or prior to the current block with two intervening reference blocks in the processing order, and to assign a high performance cost to the first intra mode when the first reference block is immediately prior to the current block, to assign a medium performance cost to the first intra mode when the first reference block is prior to the current block with one intervening reference block, and to assign a low performance cost to the first intra mode when the first reference block is prior to the current block with two intervening reference blocks.

Further to the second embodiments, the processor to select the intra coding mode for the current block is further based on quality metrics and bit rate costs associated with the plurality of intra modes.

In one or more third embodiments, a system comprises means for determining, for a current block of video data, processing performance costs for a plurality of intra modes, wherein the processing performance costs are based on one or more reference blocks associated with the plurality of intra modes and a processing order of the one or more reference blocks with respect to the current block, means for selecting an intra coding mode for the current block based at least in part on the processing performance costs for the plurality of intra modes, and means for encoding the current block into a bitstream based at least in part on the selected intra coding mode.

Further to the third embodiments, the system further comprises means for adding to a processing performance cost accumulator when the intra coding mode has a non-zero processing performance cost and means for rejecting any intra modes having a non-zero processing performance cost for a subsequent block of the video data when the processing performance cost block accumulator exceeds a threshold.

Further to the third embodiments, the means for determining the processing performance cost for a first intra mode of the plurality of intra modes comprise means for determining a first reference block associated with the first intra mode is immediately prior to the current block in the processing order.

Further to the third embodiments, the means for determining the processing performance cost for a first intra mode of the plurality of intra modes comprise means for determining a first cost based on a first reference block associated with the first intra mode and a second cost based on a second reference block associated with the first intra mode and means for summing the first and second costs to determine the processing performance cost for the first intra mode.

Further to the third embodiments, the means for determining the processing performance cost for a first intra mode of the plurality of intra modes comprise means for determining a first reference block associated with the first intra mode is at least one of immediately prior to the current block in the processing order or prior to the current block with one or more intervening reference blocks in the processing order and means for assigning a performance cost to the first intra mode when the first reference block is immediately prior to the current block and means for assigning a zero performance cost to the first intra mode when the first reference block is prior to the current block with one or more intervening reference blocks.

Further to the third embodiments, the means for determining the processing performance cost for a first intra mode of the plurality of intra modes comprise means for determining a first reference block associated with the first intra mode is at least one of immediately prior to the current block in the processing order, prior to the current block with one intervening reference block in the processing order, or prior to the current block with two intervening reference blocks in the processing order and means for assigning a high performance cost to the first intra mode when the first reference block is immediately prior to the current block, means for assigning a medium performance cost to the first intra mode when the first reference block is prior to the current block with one intervening reference block, and means for assigning a low performance cost to the first intra mode when the first reference block is prior to the current block with two intervening reference blocks.

Further to the third embodiments, the means for selecting the intra coding mode for the current block comprise means for selecting based on quality metrics and bit rate costs associated with the plurality of intra modes.

In one or more fourth embodiments, at least one machine readable medium comprises a plurality of instructions that, in response to being executed on a computing device, cause the computing device to code video by determining, for a current block of video data, processing performance costs for a plurality of intra modes, wherein the processing performance costs are based on one or more reference blocks associated with the plurality of intra modes and a processing order of the one or more reference blocks with respect to the current block, selecting an intra coding mode for the current block based at least in part on the processing performance costs for the plurality of intra modes, and encoding the current block into a bitstream based at least in part on the selected intra coding mode.

Further to the fourth embodiments, the machine readable medium comprises further comprising instructions that, in response to being executed on the computing device, cause the computing device to code video by adding to a processing performance cost accumulator when the intra coding mode has a non-zero processing performance cost and rejecting any intra modes having a non-zero processing performance cost for a subsequent block of the video data when the processing performance cost block accumulator exceeds a threshold.

Further to the fourth embodiments, determining the processing performance cost for a first intra mode of the plurality of intra modes comprises determining a first reference block associated with the first intra mode is immediately prior to the current block in the processing order.

Further to the fourth embodiments, determining the processing performance cost for a first intra mode of the plurality of intra modes comprises determining a first reference block associated with the first intra mode is at least one of immediately prior to the current block in the processing order or prior to the current block with one or more intervening reference blocks in the processing order and assigning a performance cost to the first intra mode when the first reference block is immediately prior to the current block and assigning a zero performance cost to the first intra mode when the first reference block is prior to the current block with one or more intervening reference blocks.

In one or more fifth embodiments, a computer-implemented method for video coding comprises determining an individual intra mode for each block of a plurality of blocks of video data, determining a block encode order for the plurality of blocks based on the intra modes, wherein the block encode order is different than a default block coding order, encoding the plurality of blocks based on the block encode order to generate encoded blocks associated with the plurality of blocks, re-ordering the encoded blocks based on the default block coding order, providing the re-ordered encoded blocks via a bitstream.

Further to the fifth embodiments, the block encode order comprises an order of the plurality of blocks wherein each reference block in the plurality of blocks is ordered prior to and with at least one intervening block with respect to every dependent block associated with the reference block.

Further to the fifth embodiments, determining the block encode order comprises testing the default block coding order to determine a reference block is immediately prior to a dependent block dependent upon the reference block and providing an intervening block between the reference block and the dependent block.

Further to the fifth embodiments, the default block coding order comprises a Z order walk and the block encode order comprises a modification to the Z order walk.

Further to the fifth embodiments, determining the block encode order comprises testing a plurality of available block encode orders and selecting the block encode order from the available block encode orders based on each reference block in the plurality of blocks being ordered prior to and with at least one intervening block with respect to every dependent block associated with the reference block.

Further to the fifth embodiments, determining the intra mode for each block comprises determining the intra mode based on source pixel data.

In one or more sixth embodiments, a system for video coding comprises a memory to store a blocks of video data and a processor coupled to the memory, the processor to determine an individual intra mode for each block of a plurality of blocks of the video data, determine a block encode order for the plurality of blocks based on the intra modes, wherein the block encode order is different than a default block coding order, encode the plurality of blocks based on the block encode order to generate encoded blocks associated with the plurality of blocks, re-order the encoded blocks based on the default block coding order, and provide the re-ordered encoded blocks via a bitstream.

Further to the sixth embodiments, the block encode order comprises an order of the plurality of blocks wherein each reference block in the plurality of blocks is ordered prior to and with at least one intervening block with respect to every dependent block associated with the reference block.

Further to the sixth embodiments, the processor to determine the block encode order comprises the processor to test the default block coding order to determine a reference block is immediately prior to a dependent block dependent upon the reference block and provide an intervening block between the reference block and the dependent block.

Further to the sixth embodiments, the default block coding order comprises a Z order walk and the block encode order comprises a modification to the Z order walk.

Further to the sixth embodiments, the processor to determine the block encode order comprises the processor to test a plurality of available block encode orders and select the block encode order from the available block encode orders based on each reference block in the plurality of blocks being ordered prior to and with at least one intervening block with respect to every dependent block associated with the reference block.

Further to the sixth embodiments, the processor to determine the intra mode for each block comprises the processor to determine the intra mode based on source pixel data.

In one or more seventh embodiments, a system comprises means for determining an individual intra mode for each block of a plurality of blocks of video data, means for determining a block encode order for the plurality of blocks based on the intra modes, wherein the block encode order is different than a default block coding order, means for encoding the plurality of blocks based on the block encode order to generate encoded blocks associated with the plurality of blocks, means for re-ordering the encoded blocks based on the default block coding order, and means for providing the re-ordered encoded blocks via a bitstream.

Further to the seventh embodiments, the block encode order comprises an order of the plurality of blocks wherein each reference block in the plurality of blocks is ordered prior to and with at least one intervening block with respect to every dependent block associated with the reference block.

Further to the seventh embodiments, the means for determining the block encode order comprise means for testing the default block coding order to determine a reference block is immediately prior to a dependent block dependent upon the reference block and means for providing an intervening block between the reference block and the dependent block.

Further to the seventh embodiments, the default block coding order comprises a Z order walk and the block encode order comprises a modification to the Z order walk.

Further to the seventh embodiments, the means for determining the block encode order comprise means for testing a plurality of available block encode orders and means for selecting the block encode order from the available block encode orders based on each reference block in the plurality of blocks being ordered prior to and with at least one intervening block with respect to every dependent block associated with the reference block.

Further to the seventh embodiments, the means for determining the intra mode for each block comprise means for determining the intra mode based on source pixel data.

In one or more eighth embodiments, at least one machine readable medium comprises a plurality of instructions that, in response to being executed on a computing device, cause the computing device to code video by determining an individual intra mode for each block of a plurality of blocks of video data, determining a block encode order for the plurality of blocks based on the intra modes, wherein the block encode order is different than a default block coding order, encoding the plurality of blocks based on the block encode order to generate encoded blocks associated with the plurality of blocks, re-ordering the encoded blocks based on the default block coding order, and providing the re-ordered encoded blocks via a bitstream.

Further to the eighth embodiments, the block encode order comprises an order of the plurality of blocks wherein each reference block in the plurality of blocks is ordered prior to and with at least one intervening block with respect to every dependent block associated with the reference block.

Further to the eighth embodiments, determining the block encode order comprises testing the default block coding order to determine a reference block is immediately prior to a dependent block dependent upon the reference block and providing an intervening block between the reference block and the dependent block.

Further to the eighth embodiments, determining the block encode order comprises testing a plurality of available block encode orders and selecting the block encode order from the available block encode orders based on each reference block in the plurality of blocks being ordered prior to and with at least one intervening block with respect to every dependent block associated with the reference block.

In one or more ninth embodiments, at least one machine readable medium may include a plurality of instructions that in response to being executed on a computing device, causes the computing device to perform a method according to any one of the above embodiments.

In one or more tenth embodiments, an apparatus may include means for performing a method according to any one of the above embodiments.

It will be recognized that the invention is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. A computer-implemented method for video coding comprising:
   determining, for a current block of video data, processing performance costs for a plurality of intra modes, wherein the processing performance costs are based on one or more reference blocks associated with the plurality of intra modes and a processing order of the one or more reference blocks with respect to the current block;
   selecting an intra coding mode for the current block based at least in part on the processing performance costs for the plurality of intra modes; and
   encoding the current block into a bitstream based at least in part on the selected intra coding mode.

2. The method of claim 1, further comprising:
   adding to a processing performance cost accumulator when the intra coding mode has a non-zero processing performance cost; and
   rejecting any intra modes having a non-zero processing performance cost for a subsequent block of the video data when the processing performance cost block accumulator exceeds a threshold.

3. The method of claim 1, wherein determining the processing performance cost for a first intra mode of the plurality of intra modes comprises determining a first reference block associated with the first intra mode is immediately prior to the current block in the processing order.

4. The method of claim 1, wherein determining the processing performance cost for a first intra mode of the plurality of intra modes comprises:
   determining a first cost based on a first reference block associated with the first intra mode and a second cost based on a second reference block associated with the first intra mode; and
   summing the first and second costs to determine the processing performance cost for the first intra mode.

5. The method of claim 1, wherein determining the processing performance cost for a first intra mode of the plurality of intra modes comprises:
   determining a first reference block associated with the first intra mode is at least one of immediately prior to the current block in the processing order or prior to the current block with one or more intervening reference blocks in the processing order; and
   assigning a performance cost to the first intra mode when the first reference block is immediately prior to the current block and assigning a zero performance cost to the first intra mode when the first reference block is prior to the current block with one or more intervening reference blocks.

6. The method of claim 1, wherein determining the processing performance cost for a first intra mode of the plurality of intra modes comprises:
   determining a first reference block associated with the first intra mode is at least one of immediately prior to the current block in the processing order, prior to the current block with one intervening reference block in the processing order, or prior to the current block with two intervening reference blocks in the processing order; and
   assigning a high performance cost to the first intra mode when the first reference block is immediately prior to the current block, assigning a medium performance cost to the first intra mode when the first reference block is prior to the current block with one intervening reference block, and assigning a low performance cost to the first intra mode when the first reference block is prior to the current block with two intervening reference blocks.

7. The method of claim 1, wherein selecting the intra coding mode for the current block is further based on quality metrics and bit rate costs associated with the plurality of intra modes.

8. A system for video coding comprising:
   a memory to store blocks of video data; and
   a processor coupled to the memory, the processor to determine, for a current block of the video data, processing performance costs for a plurality of intra modes, wherein the processing performance costs are based on one or more reference blocks associated with the plurality of intra modes and a processing order of the one or more reference blocks with respect to the current block, to select an intra coding mode for the current block based at least in part on the processing performance costs for the plurality of intra modes, and to encode the current block into a bitstream based at least in part on the selected intra coding mode.

9. The system of claim 8, wherein the processor is further to add to a processing performance cost accumulator when the intra coding mode has a non-zero processing performance cost and to reject any intra modes having a non-zero processing performance cost for a subsequent block of the video data when the processing performance cost block accumulator exceeds a threshold.

10. The system of claim 8, wherein the processor to determine the processing performance cost for a first intra mode of the plurality of intra modes comprises the processor to determine a first reference block associated with the first intra mode is immediately prior to the current block in the processing order.

11. The system of claim 8, wherein the processor to determine the processing performance cost for a first intra mode of the plurality of intra modes comprises the processor to determine a first cost based on a first reference block associated with the first intra mode and a second cost based on a second reference block associated with the first intra mode and to sum the first and second costs to determine the processing performance cost for the first intra mode.

12. The system of claim 8, wherein the processor to determine the processing performance cost for a first intra mode of the plurality of intra modes comprises the processor to determine a first reference block associated with the first intra mode is at least one of immediately prior to the current block in the processing order or prior to the current block with one or more intervening reference blocks in the processing order and to assign a performance cost to the first intra mode when the first reference block is immediately prior to the current block and assign a zero performance cost to the first intra mode when the first reference block is prior to the current block with one or more intervening reference blocks.

13. The system of claim 8, wherein the processor to determine the processing performance cost for a first intra mode of the plurality of intra modes comprises the processor to determine a first reference block associated with the first intra mode is at least one of immediately prior to the current block in the processing order, prior to the current block with one intervening reference block in the processing order, or prior to the current block with two intervening reference blocks in the processing order and to assign a high performance cost to the first intra mode when the first reference block is immediately prior to the current block, assign a medium performance cost to the first intra mode when the first reference block is prior to the current block with one intervening reference block, and assign a low performance cost to the first intra mode when the first reference block is prior to the current block with two intervening reference blocks.

14. The system of claim 8, wherein the processor to select the intra coding mode for the current block is further based on quality metrics and bit rate costs associated with the plurality of intra modes.

15. At least one non-transitory machine readable medium comprising a plurality of instructions that, in response to being executed on a computing device, cause the computing device to code video by:
    determining, for a current block of video data, processing performance costs for a plurality of intra modes, wherein the processing performance costs are based on one or more reference blocks associated with the plurality of intra modes and a processing order of the one or more reference blocks with respect to the current block;
    selecting an intra coding mode for the current block based at least in part on the processing performance costs for the plurality of intra modes; and
    encoding the current block into a bitstream based at least in part on the selected intra coding mode.

16. The non-transitory machine readable medium of claim 15 further comprising instructions that, in response to being executed on the computing device, cause the computing device to code video by:
    adding to a processing performance cost accumulator when the intra coding mode has a non-zero processing performance cost; and
    rejecting any intra modes having a non-zero processing performance cost for a subsequent block of the video data when the processing performance cost block accumulator exceeds a threshold.

17. The non-transitory machine readable medium of claim 15, wherein determining the processing performance cost for a first intra mode of the plurality of intra modes comprises determining a first reference block associated with the first intra mode is immediately prior to the current block in the processing order.

18. The non-transitory machine readable medium of claim 15, wherein determining the processing performance cost for a first intra mode of the plurality of intra modes comprises:
    determining a first reference block associated with the first intra mode is at least one of immediately prior to the current block in the processing order or prior to the current block with one or more intervening reference blocks in the processing order; and
    assigning a performance cost to the first intra mode when the first reference block is immediately prior to the current block and assigning a zero performance cost to the first intra mode when the first reference block is prior to the current block with one or more intervening reference blocks.

19. The non-transitory machine readable medium of claim 15, wherein determining the processing performance cost for a first intra mode of the plurality of intra modes comprises:
    determining a first cost based on a first reference block associated with the first intra mode and a second cost based on a second reference block associated with the first intra mode; and
    summing the first and second costs to determine the processing performance cost for the first intra mode.

20. The non-transitory machine readable medium of claim 15, wherein determining the processing performance cost for a first intra mode of the plurality of intra modes comprises:
    determining a first reference block associated with the first intra mode is at least one of immediately prior to the current block in the processing order, prior to the current block with one intervening reference block in the processing order, or prior to the current block with two intervening reference blocks in the processing order; and
    assigning a high performance cost to the first intra mode when the first reference block is immediately prior to the current block, assigning a medium performance cost to the first intra mode when the first reference block is prior to the current block with one intervening reference block, and assigning a low performance cost to the first intra mode when the first reference block is prior to the current block with two intervening reference blocks.

21. The non-transitory machine readable medium of claim 15, wherein selecting the intra coding mode for the current block is further based on quality metrics and bit rate costs associated with the plurality of intra modes.

\* \* \* \* \*